(12) United States Patent
Chendararai Kannan et al.

(10) Patent No.: US 10,652,775 B2
(45) Date of Patent: May 12, 2020

(54) TECHNIQUES FOR MITIGATING INTERFERENCE FOR TRANSMISSIONS OF A PERIODIC MULTI-BEAM DISCOVERY REFERENCE SIGNAL

(71) Applicant: QUALCOMM Incorporated, San Diego, CA (US)

(72) Inventors: Arumugam Chendararai Kannan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/917,493

(22) Filed: Mar. 9, 2018

(65) Prior Publication Data

US 2018/0270691 A1 Sep. 20, 2018

Related U.S. Application Data

(60) Provisional application No. 62/471,019, filed on Mar. 14, 2017.

(51) Int. Cl.
*H04W 24/10* (2009.01)
*H04L 5/00* (2006.01)
(Continued)

(52) U.S. Cl.
CPC .......... *H04W 24/10* (2013.01); *H04B 7/0408* (2013.01); *H04B 7/0695* (2013.01);
(Continued)

(58) Field of Classification Search
CPC .. H04B 7/0408; H04B 7/0417; H04B 7/0456; H04B 7/061; H04B 7/0617;
(Continued)

(56) References Cited

U.S. PATENT DOCUMENTS 8,923,126 B2 * 12/2014 Wu .................... H04W 72/1289
370/235
9,749,075 B2 * 8/2017 Liao ....................... H04J 11/005
(Continued)

FOREIGN PATENT DOCUMENTS

WO    WO-2016172840 A1    11/2016

OTHER PUBLICATIONS

International Search Report and Written Opinion—PCT/US2018/021893—ISA/EPO—dated Jun. 22, 2018 (173195WO).
(Continued)

*Primary Examiner* — Jung Liu
(74) *Attorney, Agent, or Firm* — Holland & Hart LLP

(57) ABSTRACT

Techniques are described for wireless communication. One method for wireless communication at a base station includes transmitting, on a plurality of beams, a discovery reference signal (DRS) in a first instance of a periodic multi-beam DRS. The first instance of the periodic multi-beam DRS may include the plurality of beams arranged in a first temporal order. The method may also include transmitting, on the plurality of beams, the DRS in a second instance of the periodic multi-beam DRS. The second instance of the periodic multi-beam DRS may include the plurality of beams arranged in a second temporal order that is different from the first temporal order. The method may further include performing at least one random access procedure with at least one user equipment (UE) based at least in part on the periodic multi-beam DRS.

15 Claims, 25 Drawing Sheets

(51) Int. Cl.
*H04W 84/04* (2009.01)
*H04B 7/0408* (2017.01)
*H04B 7/06* (2006.01)

(52) U.S. Cl.
CPC .......... *H04L 5/0025* (2013.01); *H04L 5/0032* (2013.01); *H04L 5/0048* (2013.01); *H04W 84/042* (2013.01)

(58) Field of Classification Search
CPC .. H04B 7/0639; H04B 7/0695; H04B 7/0626; H04L 5/005; H04W 16/28; H04W 84/042
See application file for complete search history.

(56) References Cited

U.S. PATENT DOCUMENTS

| | | | | |
|---|---|---|---|---|
| 10,200,880 | B2* | 2/2019 | Wen | H04L 5/006 |
| 10,270,509 | B2* | 4/2019 | Liu | H04B 7/04 |
| 2007/0135051 | A1* | 6/2007 | Zheng | H04B 7/18513 |
| | | | | 455/63.1 |
| 2008/0267063 | A1* | 10/2008 | Trigui | H04B 7/0408 |
| | | | | 370/229 |
| 2010/0056171 | A1* | 3/2010 | Ramprashad | H04W 16/10 |
| | | | | 455/452.1 |
| 2010/0130223 | A1* | 5/2010 | Liao | H04B 7/0617 |
| | | | | 455/453 |
| 2011/0039547 | A1* | 2/2011 | van Rensburg | H04W 72/1252 |
| | | | | 455/423 |
| 2012/0329498 | A1* | 12/2012 | Koo | H04J 11/005 |
| | | | | 455/501 |
| 2014/0071841 | A1* | 3/2014 | Hu | H04L 5/0035 |
| | | | | 370/252 |
| 2015/0049824 | A1* | 2/2015 | Kim | H04B 7/0456 |
| | | | | 375/267 |
| 2015/0092582 | A1* | 4/2015 | Liao | H04J 11/005 |
| | | | | 370/252 |
| 2015/0208269 | A1* | 7/2015 | Damnjanovic | H04L 1/0026 |
| | | | | 370/252 |
| 2015/0289293 | A1* | 10/2015 | Zhang | H04W 74/002 |
| | | | | 455/404.1 |
| 2016/0037291 | A1* | 2/2016 | Sadasivam | H04W 4/02 |
| | | | | 455/456.2 |
| 2016/0127089 | A1* | 5/2016 | Haghighat | H04W 24/02 |
| | | | | 370/329 |
| 2017/0033851 | A1* | 2/2017 | Zhong | H04B 7/0413 |
| 2018/0091196 | A1* | 3/2018 | Frenne | H04B 7/0408 |
| 2018/0109297 | A1* | 4/2018 | Furuskog | H04B 7/0617 |

OTHER PUBLICATIONS

Spreadtrum Communications: "Indication of the SS-Block Index in Multi-Beam Cases", 3GPP Draft, R1-1700288, Indication of the SS-Block Index In Multi-Beam Cases—Final, 3rd Generation Partnership Project (3GPP), Mobile Competence Centre, 650, Route Des Lucioles, F-06921, Sophiaanti, vol. RAN WG1, No. Spokane, USA, Jan. 16, 2017-Jan. 20, 2017 Jan. 16, 2017 (Jan. 16, 2017), XP051207826, Retrieved from the Internet:URL:http://www.3gpp.org/ftp/Meetings_3GPP SYNC/RAN1/Docs/ [retrieved on Jan. 16, 2017], 4 pages.

* cited by examiner

TECHNIQUES FOR MITIGATING INTERFERENCE FOR TRANSMISSIONS OF A PERIODIC MULTI-BEAM DISCOVERY REFERENCE SIGNAL

CROSS REFERENCES

The present Application for Patent claims priority to U.S. Provisional Patent Application No. 62/471,019 by Chendamarai Kannan, et al., entitled "Techniques For Mitigating Interference For Transmissions of a Periodic Multi-Beam Discovery Reference Signal," filed Mar. 14, 2017, assigned to the assignee hereof.

BACKGROUND

The present disclosure, for example, relates to wireless communication systems, and more particularly to techniques for mitigating interference (i.e., increasing interference robustness) for transmissions of a periodic multi-beam discovery reference signal (DRS).

Wireless communication systems are widely deployed to provide various types of communication content such as voice, video, packet data, messaging, broadcast, etc. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communication system may include a number of base stations, each simultaneously supporting communication for multiple communication devices, otherwise known as UEs. In a Long-Term Evolution (LTE) or LTE-Advanced (LTE-A) network, a set of one or more base stations may define an eNodeB (eNB). In a next generation, new radio (NR), millimeter wave (mmW), or 5G network, a base station may take the form of a smart radio head (or radio head (RH)) or access node controller (ANC), with a set of smart radio heads in communication with an ANC defining a gNodeB (gNB). A base station may communicate with a set of UEs on downlink channels (e.g., for transmissions from a base station to a UE) and uplink channels (e.g., for transmissions from a UE to a base station).

Wireless devices that operate in mmW frequency ranges, e.g., 28 GHz, 40 GHz, 60 GHz, etc. may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies.

SUMMARY

When transmitting a discovery reference signal (DRS) in a millimeter wave (mmW) spectrum, a base station may transmit the DRS on each of a plurality of beams (e.g., directional beams). In some cases, the DRS may be transmitted on each of the plurality of beams in succession, as part of a "multi-beam DRS" or "beam sweep." Instances of a multi-beam DRS may be repeated periodically to form a periodic multi-beam DRS. By way of example, the instances of a periodic multi-beam DRS may be transmitted every 10 or 20 milliseconds (ms), in accordance with a macro periodicity. In some examples, more than one instance of the periodic multi-beam DRS may be transmitted during each macro period of the periodic multi-beam DRS. For example, multiple instances of the periodic multi-beam DRS may be transmitted in succession during a 1 ms micro period within each 10 or 20 ms macro period. However, when two synchronous cells each transmit a periodic multi-beam DRS with the same periodicity, and the plurality of beams included in each periodic multi-beam DRS interfere at a particular location, a UE at the location may not be able to receive a DRS from the cell. The present disclosure describes techniques for mitigating persistent interference between beams of periodic multi-beam DRS transmitted by different cells.

In one example, a method for wireless communication at a base station is described. The method may include transmitting, on a plurality of beams, a DRS in a first instance of a periodic multi-beam DRS. The first instance of the periodic multi-beam DRS may include the plurality of beams arranged in a first temporal order. The method may also include transmitting, on the plurality of beams, the DRS in a second instance of the periodic multi-beam DRS. The second instance of the periodic multi-beam DRS may include the plurality of beams arranged in a second temporal order that is different from the first temporal order.

In one example, an apparatus for wireless communication at a base station is described. the apparatus may include a processor, memory in electronic communication with the processor, and instructions stored in the memory. The instructions may be executable by the processor to transmit, on a plurality of beams, a DRS in a first instance of a periodic multi-beam DRS. The first instance of the periodic multi-beam DRS may include the plurality of beams arranged in a first temporal order. The instructions may also be executable by the processor to transmit, on the plurality of beams, the DRS in a second instance of the periodic multi-beam DRS. The second instance of the periodic multi-beam DRS may include the plurality of beams arranged in a second temporal order that is different from the first temporal order.

In one example, another apparatus for wireless communication at a base station is described. The apparatus may include means for transmitting, on a plurality of beams, a DRS in a first instance of a periodic multi-beam DRS. The first instance of the periodic multi-beam DRS may include the plurality of beams arranged in a first temporal order. The apparatus may also include means for transmitting, on the plurality of beams, the DRS in a second instance of the periodic multi-beam DRS. The second instance of the periodic multi-beam DRS may include the plurality of beams arranged in a second temporal order that is different from the first temporal order.

In one example, a non-transitory computer-readable medium storing computer-executable code for wireless communication at a base station is described. The code may be executable by a processor to transmit, on a plurality of beams, a DRS in a first instance of a periodic multi-beam DRS. The first instance of the periodic multi-beam DRS may include the plurality of beams arranged in a first temporal order. The code may also be executable by the processor to transmit, on the plurality of beams, the DRS in a second instance of the periodic multi-beam DRS. The second instance of the periodic multi-beam DRS may include the plurality of beams arranged in a second temporal order that is different from the first temporal order.

Some examples of the method, apparatus, and non-transitory computer-readable medium described above may additionally include processes, features, means, or instructions for transmitting the DRS on a beam in each instance of a plurality of instances of the periodic multi-beam DRS. The plurality of instances of the periodic multi-beam DRS may include the first instance of the periodic multi-beam DRS and the second instance of the periodic multi-beam DRS. In some examples, the first instance of the periodic multi-beam DRS and the second instance of the periodic multi-beam DRS may be consecutive instances based at least in part on the plurality of beams.

Some examples of the method, apparatus, and non-transitory computer-readable medium described above may additionally include processes, features, means, or instructions for transmitting the DRS on a beam in each instance of a plurality of instances of the periodic multi-beam DRS. The plurality of instances of the periodic multi-beam DRS may include the first instance of the periodic multi-beam DRS. Each instance in the plurality of instances may comprise the plurality of beams arranged in the first temporal order. In some examples, the plurality of instances of the periodic multi-beam DRS may include consecutive instances based at least in part on the plurality of beams.

Some examples of the method, apparatus, and non-transitory computer-readable medium described above may additionally include processes, features, means, or instructions for transmitting information identifying at least one of the first temporal order or the second temporal order.

Some examples of the method, apparatus, and non-transitory computer-readable medium described above may additionally include processes, features, means, or instructions for selecting the first temporal order based at least in part on a set of one or more information bits to be conveyed by the DRS, on a beam in the first instance of the periodic multi-beam DRS. In some examples, the or more information bits may include at least one of: at least a part of a cell identifier, at least a portion of timing information for a cell, at least a part of a system frame number, or a combination.

Some examples of the method, apparatus, and non-transitory computer-readable medium described above may additionally include processes, features, means, or instructions for performing at least one random access procedure with at least one UE based at least in part on the periodic multi-beam DRS.

In one example, a method for wireless communication at a UE is described. The method may include receiving on a beam of a plurality of beams, from a base station, a DRS in at least a first instance or a second instance of a periodic multi-beam DRS. The first instance of the periodic multi-beam DRS may include the plurality of beams arranged in a first temporal order, and the second instance of the periodic multi-beam DRS may comprise the plurality of beams arranged in a second temporal order that is different from the first temporal order.

In one example, an apparatus for wireless communication at a UE is described. The apparatus may include a processor, memory in electronic communication with the processor, and instructions stored in the memory. The instructions may be executable by the processor to receive on a beam of a plurality of beams, from a base station, a DRS in a first instance of a periodic multi-beam DRS. The first instance of the periodic multi-beam DRS may include the plurality of beams arranged in a first temporal order, and a second instance of the periodic multi-beam DRS may include the plurality of beams arranged in a second temporal order that is different from the first temporal order.

In one example, another apparatus for wireless communication at a UE is described. The apparatus may include means for receiving on a beam of a plurality of beams, from a base station, a DRS in at least a first instance or a second instance of a periodic multi-beam DRS. The first instance of the periodic multi-beam DRS may include the plurality of beams arranged in a first temporal order, and the second instance of the periodic multi-beam DRS may include the plurality of beams arranged in a second temporal order that is different from the first temporal order. The apparatus may also include means for receiving the DRS on the beam, from the base station, in the second instance of the periodic multi-beam DRS.

In one example, a non-transitory computer-readable medium storing computer-executable code for wireless communication at a UE is described. The code may be executable by a processor to receive on a beam of a plurality of beams, from a base station, a DRS in at least a first instance or a second instance of a periodic multi-beam DRS. The first instance of the periodic multi-beam DRS may include the plurality of beams arranged in a first temporal order, and the second instance of the periodic multi-beam DRS may include the plurality of beams arranged in a second temporal order that is different from the first temporal order.

Some examples of the method, apparatus, and non-transitory computer-readable medium described above may additionally include processes, features, means, or instructions for receiving the DRS on the beam, from the base station, in each instance of a plurality of instances of the periodic multi-beam DRS. The plurality of instances of the periodic multi-beam DRS may include the first instance of the periodic multi-beam DRS and the second instance of the periodic multi-beam DRS. In some examples, the first instance of the periodic multi-beam DRS and the second instance of the periodic multi-beam DRS may be consecutive instances based at least in part on the plurality of beams.

Some examples of the method, apparatus, and non-transitory computer-readable medium described above may additionally include processes, features, means, or instructions for receiving the DRS on the beam, from the base station, in each instance of a plurality of instances of the periodic multi-beam DRS; and combining the DRS across multiple instances of the plurality of instances of the periodic multi-beam DRS. The plurality of instances of the periodic multi-beam DRS may include the first instance of the periodic multi-beam DRS, and each instance in the plurality of instances may include the plurality of beams arranged in the first temporal order. In some examples, the plurality of instances of the periodic multi-beam DRS may include consecutive instances based at least in part on the plurality of beams.

Some examples of the method, apparatus, and non-transitory computer-readable medium described above may additionally include processes, features, means, or instructions for identifying at least one of the first temporal order or the second temporal order based at least in part on: first information stored at the UE, second information received from the base station, third information received from a second base station, blind detection, or a combination.

In some examples of the method, apparatus, and non-transitory computer-readable medium described above, the base station may be associated with a candidate non-primary cell for the UE; and the method, apparatus, and non-transitory computer-readable medium described above may additionally include processes, features, means, or instructions for receiving, from a second base station associated with a primary cell for the UE, information identifying at least one of the first temporal order or the second temporal order for the candidate non-primary cell. The DRS may be received from the base station based at least in part on the information received from the second base station.

Some examples of the method, apparatus, and non-transitory computer-readable medium described above may additionally include processes, features, means, or instructions for blindly detecting the first temporal order; and inferring a set of one or more information bits based at least in part on the first temporal order. In some examples, the set of one or more information bits may include at least one of: at least a part of a cell identifier, at least a portion of timing information for a cell, at least a part of a system frame number, or a combination.

Some examples of the method, apparatus, and non-transitory computer-readable medium described above may additionally include processes, features, means, or instructions for performing a random access procedure with the base station based at least in part on the DRS.

In one example, another method for wireless communication at a base station is described. The method may include transmitting, on a plurality of beams, a DRS in a first instance of a periodic multi-beam DRS. The DRS in the first instance of the periodic multi-beam DRS may include a synchronization signal sequence encoded based at least in part on a first code. The method may also include transmitting, on the plurality of beams, the DRS in a second instance of the periodic multi-beam DRS. The DRS in the second instance of the periodic multi-beam DRS may include the synchronization signal sequence encoded based at least in part on a second code that is different form the first code.

In one example, another apparatus for wireless communication at a base station is described. The apparatus may include a processor, memory in electronic communication with the processor, and instructions stored in the memory. The instructions may be executable by the processor to transmit, on a plurality of beams, a DRS in a first instance of a periodic multi-beam DRS. The DRS in the first instance of the periodic multi-beam DRS may include a synchronization signal sequence encoded based at least in part on a first code. The instructions may also be executable by the processor to transmit, on the plurality of beams, the DRS in a second instance of the periodic multi-beam DRS. The DRS in the second instance of the periodic multi-beam DRS may include the synchronization signal sequence encoded based at least in part on a second code that is different form the first code.

In one example, another apparatus for wireless communication at a base station is described. The apparatus may include means for transmitting, on a plurality of beams, a DRS in a first instance of a periodic multi-beam DRS. The DRS in the first instance of the periodic multi-beam DRS may include a synchronization signal sequence encoded based at least in part on a first code. The apparatus may also include means for transmitting, on the plurality of beams, the DRS in a second instance of the periodic multi-beam DRS. The DRS in the second instance of the periodic multi-beam DRS may include the synchronization signal sequence encoded based at least in part on a second code that is different form the first code.

In one example, another non-transitory computer-readable medium storing computer-executable code for wireless communication at a base station is described. The code may be executable by a processor to transmit, on a plurality of beams, a DRS in a first instance of a periodic multi-beam DRS. The DRS in the first instance of the periodic multi-beam DRS may include a synchronization signal sequence encoded based at least in part on a first code. The code may also be executable by the processor to transmit, on the plurality of beams, the DRS in a second instance of the periodic multi-beam DRS. The DRS in the second instance of the periodic multi-beam DRS may include the synchronization signal sequence encoded based at least in part on a second code that is different form the first code.

Some examples of the method, apparatus, and non-transitory computer-readable medium described above may additionally include processes, features, means, or instructions for transmitting the DRS on a beam in each instance of a plurality of instances of the periodic multi-beam DRS. The plurality of instances of the periodic multi-beam DRS may include the first instance of the periodic multi-beam DRS and the second instance of the periodic multi-beam DRS. In some examples, the first instance of the periodic multi-beam DRS and the second instance of the periodic multi-beam DRS may be consecutive instances based at least in part on the plurality of beams.

Some examples of the method, apparatus, and non-transitory computer-readable medium described above may additionally include processes, features, means, or instructions for transmitting the DRS on a beam in each instance of a plurality of instances of the periodic multi-beam DRS. The plurality of instances of the periodic multi-beam DRS may include the first instance of the periodic multi-beam DRS, and each instance in the plurality of instances may include the DRS with the synchronization signal sequence encoded based at least in part on the first code. In some examples, the plurality of instances of the periodic multi-beam DRS may include consecutive instances based at least in part on the plurality of beams.

Some examples of the method, apparatus, and non-transitory computer-readable medium described above may additionally include processes, features, means, or instructions for transmitting information identifying at least one of the first code or the second code.

In some examples of the method, apparatus, and non-transitory computer-readable medium described above, the first code or the second code may include at least one of: a scrambling code, an orthogonal cover code, or a combination.

Some examples of the method, apparatus, and non-transitory computer-readable medium described above may additionally include processes, features, means, or instructions for selecting the first code based at least in part on a set of one or more information bits to be conveyed by the DRS, on a beam in the first instance of the periodic multi-beam DRS. In some examples, the set of one or more information bits may include at least one of: at least a part of a cell identifier, at least a portion of timing information for a cell, at least a part of a system frame number, or a combination.

Some examples of the method, apparatus, and non-transitory computer-readable medium described above may additionally include processes, features, means, or instructions for performing at least one random access procedure with at least one UE based at least in part on the periodic multi-beam DRS.

In one example, another method for wireless communication at a UE is described. The method may include receiving on a beam of a plurality of beams, from a base station, a DRS in at least a first instance or a second instance of a periodic multi-beam DRS. The first instance of the periodic multi-beam DRS may include a synchronization signal sequence encoded based at least in part on a first code, and the second instance of the periodic multi-beam DRS may include the DRS with the synchronization signal sequence encoded based at least in part on a second code that is different from the first code. The method may also include decoding the synchronization signal sequence based at least in part on the first code.

In one example, another apparatus for wireless communication at a UE is described. The apparatus may include a processor, memory in electronic communication with the processor, and instructions stored in the memory. The instructions may be executable by the processor to receive on a beam of a plurality of beams, from a base station, a DRS in at least a first instance or a second instance of a periodic multi-beam DRS. The first instance of the periodic multi-beam DRS may include a synchronization signal sequence encoded based at least in part on a first code, and a second instance of the periodic multi-beam DRS may include the DRS with the synchronization signal sequence encoded based at least in part on a second code that is different from the first code. The instructions may also be executable by the processor to decode the synchronization signal sequence based at least in part on the first code.

In one example, another apparatus for wireless communication at a UE is described. The apparatus may include means for receiving on a beam of a plurality of beams, from a base station, a DRS in at least a first instance or a second instance of a periodic multi-beam DRS. The first instance of the periodic multi-beam DRS may include a synchronization signal sequence encoded based at least in part on a first code, and a second instance of the periodic multi-beam DRS may include the DRS with the synchronization signal sequence encoded based at least in part on a second code that is different from the first code. The apparatus may also include means for decoding the synchronization signal sequence based at least in part on the first code.

In one example, a non-transitory computer-readable medium storing computer-executable code for wireless communication at a UE is described. The code may be executable by a processor to receive on a beam of a plurality of beams, from a base station, a DRS in at least a first instance or a second instance of a periodic multi-beam DRS. The first instance of the periodic multi-beam DRS may include a synchronization signal sequence encoded based at least in part on a first code, and the second instance of the periodic multi-beam DRS may include the DRS with the synchronization signal sequence encoded based at least in part on a second code that is different from the first code. The code may also be executable by the processor to decode the synchronization signal sequence based at least in part on the first code.

Some examples of the method, apparatus, and non-transitory computer-readable medium described above may additionally include processes, features, means, or instructions for receiving the DRS on the beam, from the base station, in each instance of a plurality of instances of the periodic multi-beam DRS; decoding the synchronization signal sequence based at least in part on the second code; and combining the DRS across multiple instances of the plurality of instances of the periodic multi-beam DRS. The plurality of instances of the periodic multi-beam DRS may include the first instance of the periodic multi-beam DRS and the second instance of the periodic multi-beam DRS. In some examples, the first instance of the periodic multi-beam DRS and the second instance of the periodic multi-beam DRS may be consecutive instances based at least in part on the plurality of beams.

Some examples of the method, apparatus, and non-transitory computer-readable medium described above may additionally include processes, features, means, or instructions for receiving the DRS on the beam, from the base station, in each instance of a plurality of instances of the periodic multi-beam DRS; and combining the DRS across multiple instances of the plurality of instances of the periodic multi-beam DRS. The plurality of instances of the periodic multi-beam DRS may include the first instance of the periodic multi-beam DRS; and each instance in the plurality of instances may include the DRS with the synchronization signal sequence encoded based at least in part on the first code. In some examples, the plurality of instances of the periodic multi-beam DRS may include consecutive instances based at least in part on the plurality of beams.

Some examples of the method, apparatus, and non-transitory computer-readable medium described above may additionally include processes, features, means, or instructions for identifying at least one of the first code or the second code based at least in part on: first information stored at the UE, second information received from the base station, third information received from a second base station, blind detection, or any combination.

In some examples of the method, apparatus, and non-transitory computer-readable medium described above, the first code or the second code may include at least one of: a scrambling code, an orthogonal cover code, or a combination.

Some examples of the method, apparatus, and non-transitory computer-readable medium described above may additionally include processes, features, means, or instructions for blindly detecting the first code; and inferring a set of one or more information bits based at least in part on the first code. In some examples, the set of one or more information bits may include at least one of: at least a part of a cell identifier, at least a portion of timing information for a cell, at least a part of a system frame number, or a combination.

Some examples of the method, apparatus, and non-transitory computer-readable medium described above may additionally include processes, features, means, or instructions for performing a random access procedure with the base station based at least in part on the DRS.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

An additional understanding of the nature and advantages of the present disclosure may be realized by reference to the following drawings. In the appended figures, similar components or features may have the same reference label. Additionally, various components of the same type may be distinguished by following the reference label by a dash and a second label that distinguishes among the similar components of the same type. If only the first reference label is used in the specification, the description may be applicable to any one of the similar components having the same first reference label irrespective of the second reference label.

DETAILED DESCRIPTION

A wireless communication system (e.g., a millimeter wave (mmW) system) may utilize directional or beamformed transmissions (e.g., beams) for communication. For example, a base station may transmit signals on multiple beams associated with different directions. In some cases, the base station may engage in beam sweeping over a portion (or all) of the possible beams for transmitting messages or signals intended for at least one user equipment (UE) distributed throughout a coverage area of the base station. For example, a base station may transmit a discovery reference signal (DRS) on one or more beams (i.e., as a periodic multi-beam DRS). A UE that receives a DRS from the base station may use the DRS to synchronize with the base station, to acquire a network, and to obtain information for initiating a random access procedure with the base station. Techniques described in the present disclosure may be used to mitigate persistent interference between beams of periodic multi-beam DRS transmitted by different cells.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described; and various operations may be added, omitted, or combined. Additionally, features described with respect to some examples may be combined in some other examples.

Figure 1:
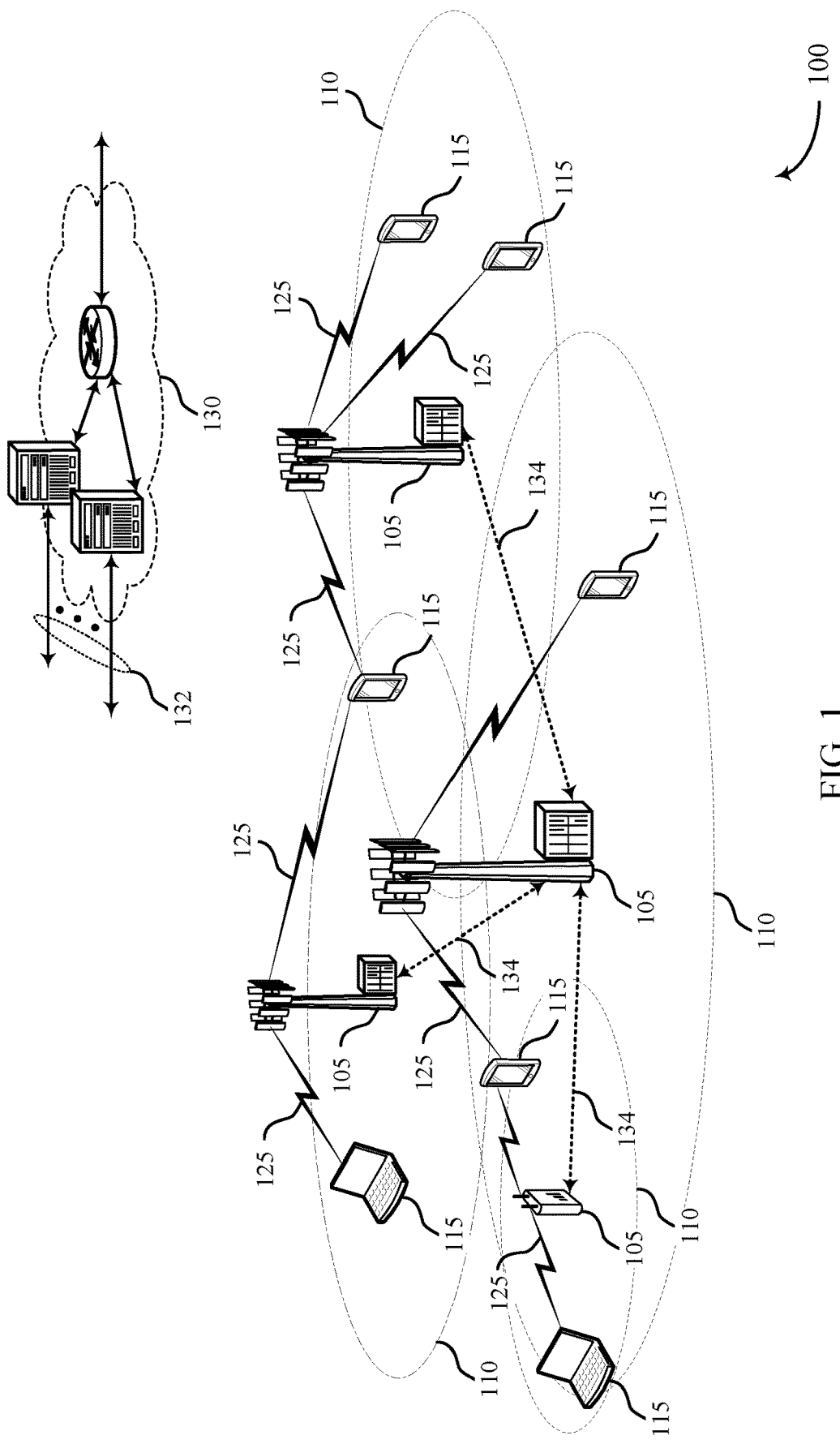
FIG. 1 shows an example of a wireless communication system, in accordance with various aspects of the present disclosure.

FIG. 1 illustrates an example of a wireless communication system 100 in accordance with various aspects of the present disclosure. The wireless communication system 100 includes base stations 105, UEs 115, and a core network 130. In some examples, the wireless communication system 100 may be a Long Term Evolution (LTE), LTE-Advanced (LTE-A) network, or a New Radio (NR) network. In some cases, wireless communication system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communication system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communication system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information, and relay that information to a central server or application program. The central server or application program may make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and a wireless communication system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may also communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) or gNodeBs (gNBs).

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be coupled with the P-GW. The P-GW may provide IP address allocation as well as other functions. The P-GW may be coupled with the network operators IP services. The network operators IP services may include the Internet, the Intranet, an IP Multimedia Subsystem (IMS), and a Packet-Switched (PS).

The core network 130 may provide user authentication, access authorization, tracking, IP connectivity, and other access, routing, or mobility functions. At least some of the network devices, such as base stations 105 may include subcomponents such as an access network entity, which may be an example of an access node controller (ANC). Each access network entity may communicate with a number of UEs 115 through a number of other access network transmission entities; each of which may be an example of a smart radio head, or a transmission/reception point (TRP). In some examples, various functions of each access network entity or base station 105 may be distributed across various network devices (e.g., radio heads and access network controllers) or consolidated into a single network device (e.g., a base station 105).

At times, a UE 115 may perform an initial access (or initial acquisition) procedure with a base station 105. When performing the initial access procedure, the UE 115 may search for a synchronization channel transmitted by the base station 105. The synchronization channel may include information to synchronize the UE 115 with the base station 105, so that the UE 115 may communicate with the base station 105. After synchronizing with the base station 105, the UE 115 may initiate a random access procedure with the network by transmitting a random access preamble to the network.

In some examples, a base station 105 may transmit, on a plurality of beams, a DRS in a first instance of a periodic multi-beam DRS. The first instance of the periodic multi-beam DRS may include the plurality of beams arranged in a first temporal order. The base station 105 may also transmit, on the plurality of beams, the DRS in a second instance of the periodic multi-beam DRS. The second instance of the periodic multi-beam DRS may include the plurality of beams arranged in a second temporal order that is different from the first temporal order. The base station 105 may additionally perform at least one random access procedure with at least one UE 115 based on the periodic multi-beam DRS.

In some examples, a base station 105 may transmit, on a plurality of beams, a DRS in a first instance of a periodic multi-beam DRS. The DRS in the first instance of the periodic multi-beam DRS may include a synchronization signal sequence encoded based on a first code. The base station 105 may also transmit, on the plurality of beams, the DRS in a second instance of the periodic multi-beam DRS. The DRS in the second instance of the periodic multi-beam DRS may include the synchronization signal sequence encoded based on a second code that is different form the first code. The base station 105 may additionally perform at least one random access procedure with at least one UE 115 based on the periodic multi-beam DRS.

In some examples, a UE 115 may receive on a beam of a plurality of beams, from a base station 105, a DRS in at least a first instance or a second instance of a periodic multi-beam DRS. The first instance of the periodic multi-beam DRS may include the plurality of beams arranged in a first temporal order. The second instance of the periodic multi-beam DRS may include the plurality of beams arranged in a second temporal order that is different from the first temporal order. The UE 115 may also perform a random access procedure with the base station 105 based on the DRS.

In some examples, a UE 115 may receive on a beam of a plurality of beams, from a base station 105, a DRS in at least a first instance or a second instance of a periodic multi-beam DRS. The DRS may include a synchronization signal sequence encoded based on a first code. The second instance of the periodic multi-beam DRS may include the DRS with the synchronization signal sequence encoded based on a second code that is different from the first code. The UE 115 may also decode the synchronization signal sequence based on the first code, and may perform a random access procedure with the base station 105 based on the DRS.

Figure 2:
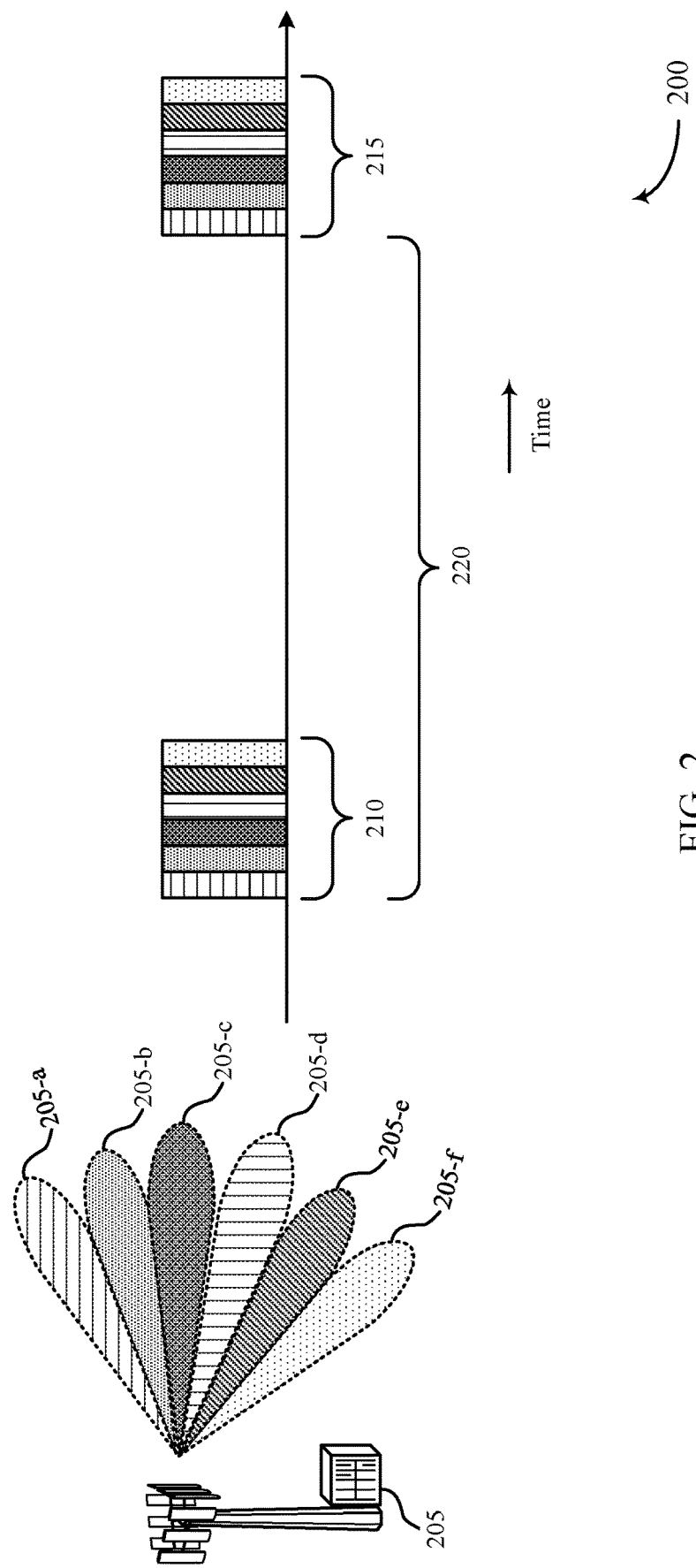
FIG. 2 shows a timeline of multi-beam DRS transmissions, in accordance with various aspects of the present disclosure.

FIG. 2 shows a timeline 200 of a periodic multi-beam DRS, in accordance with various aspects of the present disclosure. The periodic multi-beam DRS, including a first instance 210 of the periodic multi-beam DRS and a second instance 215 of the periodic multi-beam DRS, may be transmitted by a base station 205. The base station 205 may be an example of aspects of one or more base stations 105, described with reference to FIG. 1.

Each instance of the periodic multi-beam DRS may include a plurality of DRS transmissions transmitted over a licensed radio frequency spectrum band or an unlicensed radio frequency spectrum band, with each DRS transmission being transmitted on a beam (i.e., on different directional beams 205, including, for example, a first beam 205-a, a second beam 205-b, a third beam 205-c, a fourth beam 205-d, a fifth beam 205-e, and a sixth beam 205-f) formed by the base station 205. In some examples, the plurality of DRS transmissions in an instance of a periodic multi-beam DRS may be adjacent or closely spaced (i.e., substantially proximal) in time (e.g., using a transmit beam sweep).

Figure 3:
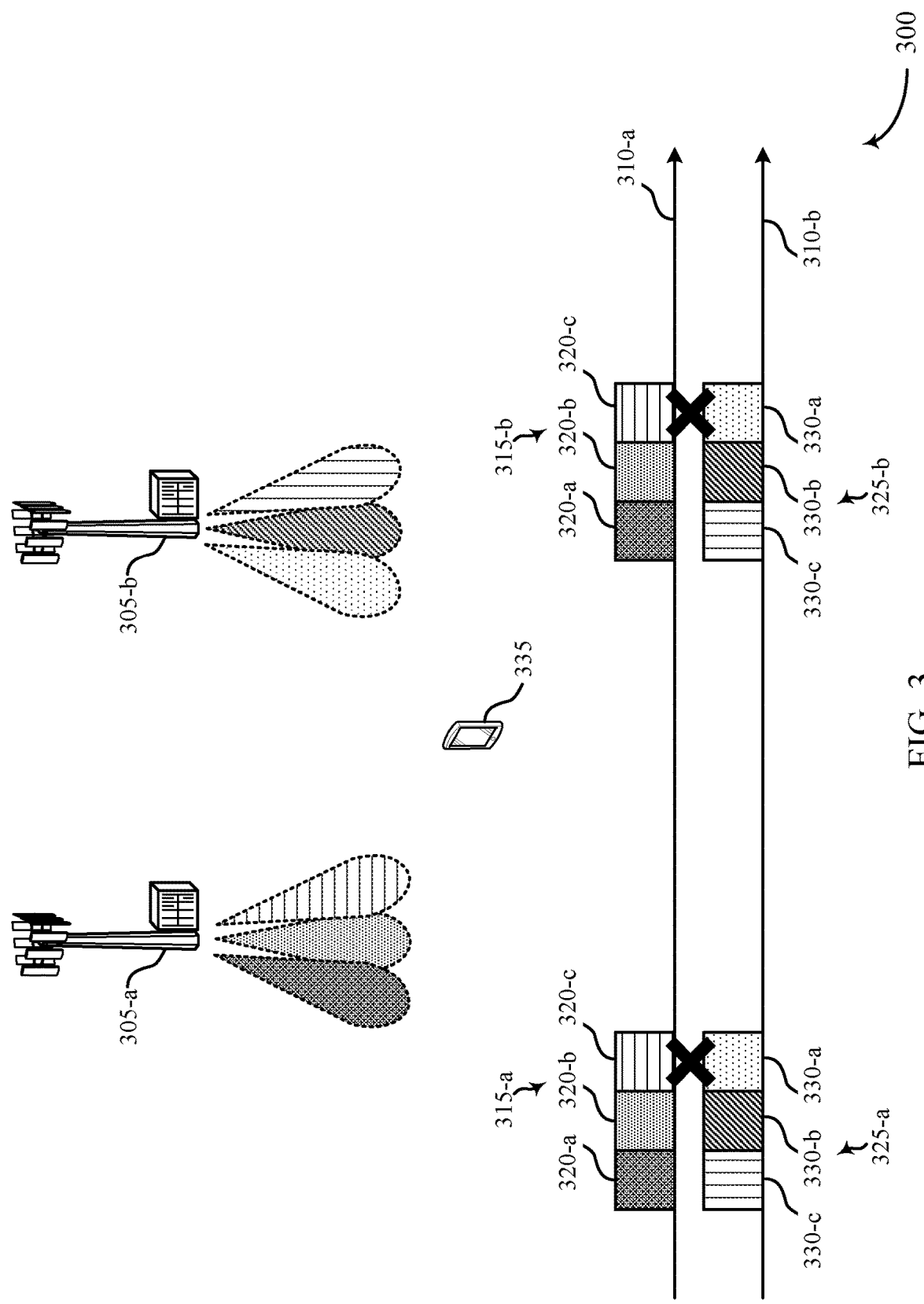
FIGS. 3-5 show timelines of periodic multi-beam transmissions, by a first base station associated with a first cell, and a second base station associated with a second cell, in accordance with various aspects of the present disclosure.

FIG. 3 shows timelines 300 of periodic multi-beam DRS transmissions, by a first base station 305-a associated with a first cell and a second base station 305-b associated with a second cell, in accordance with various aspects of the present disclosure. The first base station 305-a and second base station 305-b may be examples of aspects of one or more base stations 105 or 205, described with reference to FIG. 1 or 2. The first cell and the second cell may be cells of a same network operator or different network operators.

A first timeline 310-a shows transmission of a plurality of instances 315 of a periodic multi-beam DRS by the first base station 305-a. The instances 315 of the periodic multi-beam DRS may include a first instance 315-a of the periodic multi-beam DRS, a second instance 315-b of the periodic multi-beam DRS, etc. Each instance 315 of the periodic multi-beam DRS may include a DRS transmitted on each beam of a first plurality of beams 320 (e.g., a first beam 320-a, a second beam 320-b, and a third beam 320-c).

A second timeline 310-b shows transmission of a plurality of instances 325 of a periodic multi-beam DRS by the second base station 305-b. The instances 325 of the periodic multi-beam DRS may include a first instance 325-a of the periodic multi-beam DRS, a second instance 325-b of the periodic multi-beam DRS, etc. Each instance 325 of the periodic multi-beam DRS may include a DRS transmitted on each beam of a second plurality of beams 330 (e.g., a fourth beam 330-a, a fifth beam 330-b, and a sixth beam 330-c).

By way of example, a UE 335 may be at a location capable of receiving a DRS on the third beam 320-c of the first base station 305-a or the fourth beam 330-a of the second base station 305-b. However, as shown by the X's between the timelines 310-a and 310-b, interference may exist between the third beam 320-c and the fourth beam 330-a at the location of the UE 335. If the first base station 305-a and second base station 305-b are associated with synchronous cells that transmit the instances 315 and the instances 325 of the periodic multi-beam DRSs, at the same time and periodicity; and if the first base station 305-a and the second base station 305-b transmit the instances 315 and the instances 325 of the periodic multi-beam DRSs using a same beam pattern (e.g., three beams transmitted using a same beam sweep timing), then the third beam 320-c and the fourth beam 330-a may interfere with each other indefinitely. The signal-to-interference plus noise ratio (SINR) of the third beam 320-c and the fourth beam 330-a, at the location of the UE 335, may suffer repeatedly, and the UE 335 may be unable to acquire a network via the first base station 305-a or the second base station 305-b, at the location. A similar interference scenario may occur for other repetitive signals, such as random access signals (e.g., random access channel (RACH) transmissions), paging signals, etc.

The interference scenario described with reference to FIG. 3 may occur in a dedicated radio frequency spectrum band or a shared radio frequency spectrum band. The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A, 5G, or NR communications). The shared radio frequency spectrum band may include a radio frequency spectrum band for which transmitting apparatuses may contend for access (e.g., a radio frequency spectrum band that is available for unlicensed use, such as: Wi-Fi use, a radio frequency spectrum band that is available for use by different radio access technologies, or a radio frequency spectrum band that is available for use by multiple operators in an equally shared or prioritized manner).

In some examples, repetitive interference with a DRS included in a periodic multi-beam DRS may be mitigated by permuting a temporal order of a plurality of beams in instances of the periodic multi-beam DRS. For example, the plurality of beams may be arranged in a first temporal order in a first instance of the periodic multi-beam DRS, and in a second temporal order in a second instance of the periodic multi-beam DRS. In some examples, a first base station associated with a first cell may permute the temporal order of a first plurality of beams in accordance with a first parameter (e.g., a first beam shift sequence), and a second base station associated with a second cell may permute the temporal order of a second plurality of beams (or the first plurality of beams) in accordance with a second parameter (e.g., a second beam shift sequence).

Figure 4:
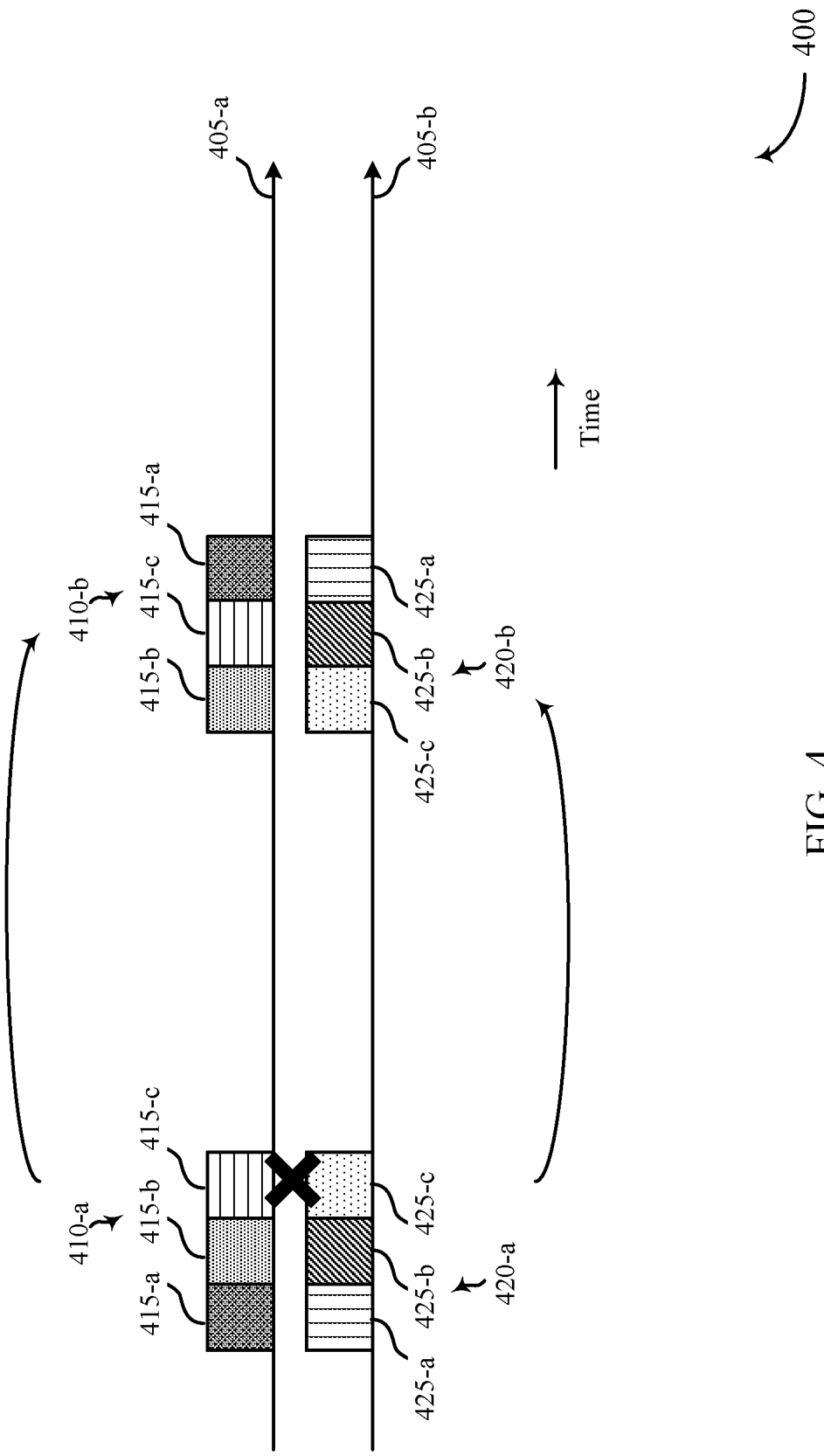

FIG. 4 shows timelines 400 of periodic multi-beam DRS transmissions, by a first base station associated with a first cell and a second base station associated with a second cell, in accordance with various aspects of the present disclosure. The first base station and second base station may be examples of base stations 105, 205, or 305, described with reference to FIG. 1, 2, or 3. The first cell and the second cell may be cells of a same network operator or different network operators.

A first timeline 405-a shows transmission of a plurality of instances 410 of a periodic multi-beam DRS by the first base station. The instances 410 of the periodic multi-beam DRS may include a first instance 410-a of the periodic multi-beam DRS, a second instance 410-b of the periodic multi-beam DRS, etc. Each instance 410 of the periodic multi-beam DRS may include a DRS transmitted on each beam of a first plurality of beams 415 (e.g., a first beam 415-a, a second beam 415-b, and a third beam 415-c). In the first instance 410-a of the periodic multi-beam DRS, the beams 415 may be arranged in a first temporal order (e.g., the first beam 415-a, followed by the second beam 415-b, followed by the third beam 415-c). In the second instance 410-b of the periodic multi-beam DRS, the beams 415 may be arranged in a second temporal order (e.g., the second beam 415-b, followed by the third beam 415-c, followed by the first beam 415-a).

A second timeline 405-b shows transmission of a plurality of instances 420 of a periodic multi-beam DRS by the second base station. The instances 420 of the periodic multi-beam DRS may include a first instance 420-a of the periodic multi-beam DRS, a second instance 420-b of the periodic multi-beam DRS, etc. Each instance 420 of the periodic multi-beam DRS may include a DRS transmitted on each beam of a second plurality of beams 425 (e.g., a fourth beam 425-a, a fifth beam 425-b, and a sixth beam 425-c). In the first instance 420-*a* of the periodic multi-beam DRS, the beams 425 may be arranged in a first temporal order (e.g., the first beam 425-*a*, followed by the second beam 425-*b*, followed by the third beam 425-*c*). In the second instance 420-*b* of the periodic multi-beam DRS, the beams 425 may be arranged in a third temporal order (e.g., the third beam 425-*c*, followed by the second beam 425-*b*, followed by the first beam 425-*a*).

By way of example, the temporal order of the first plurality of beams 415 is shown to be permuted, between the instances 410 of the periodic multi-beam DRS transmitted by the first base station, in accordance with a first parameter (e.g., a first beam shift sequence). The second plurality of beams 425 is shown to be permuted, between the instances 420 of the periodic multi-beam DRS transmitted by the second base station, in accordance with a second parameter (e.g., a second beam shift sequence). Thus, if the third beam 415-*c* of the first plurality of beams 415 interferes with reception of the third beam 425-*c* of the second plurality of beams 425, at a location of a UE, when the third beam 415-*c* and the third beam 425-*c* are transmitted at the same time (designated by an X between the timelines 405-*a* and 405-*b*); the permutation of one or both of the first plurality of beams 415 or the second plurality of beams 425, across different instances of a multi-beam DRS, such that the temporal order of the first plurality of beams 415 changes with respect to the temporal order of the second plurality of beams 425, may result in transmissions of the third beam 415-*c* in the absence of the third beam 425-*c* and vice versa. The result may thereby potentially enable the UE to receive the third beam 415-*c* and/or the third beam 425-*c* (and the DRS transmitted thereon).

Figure 5:
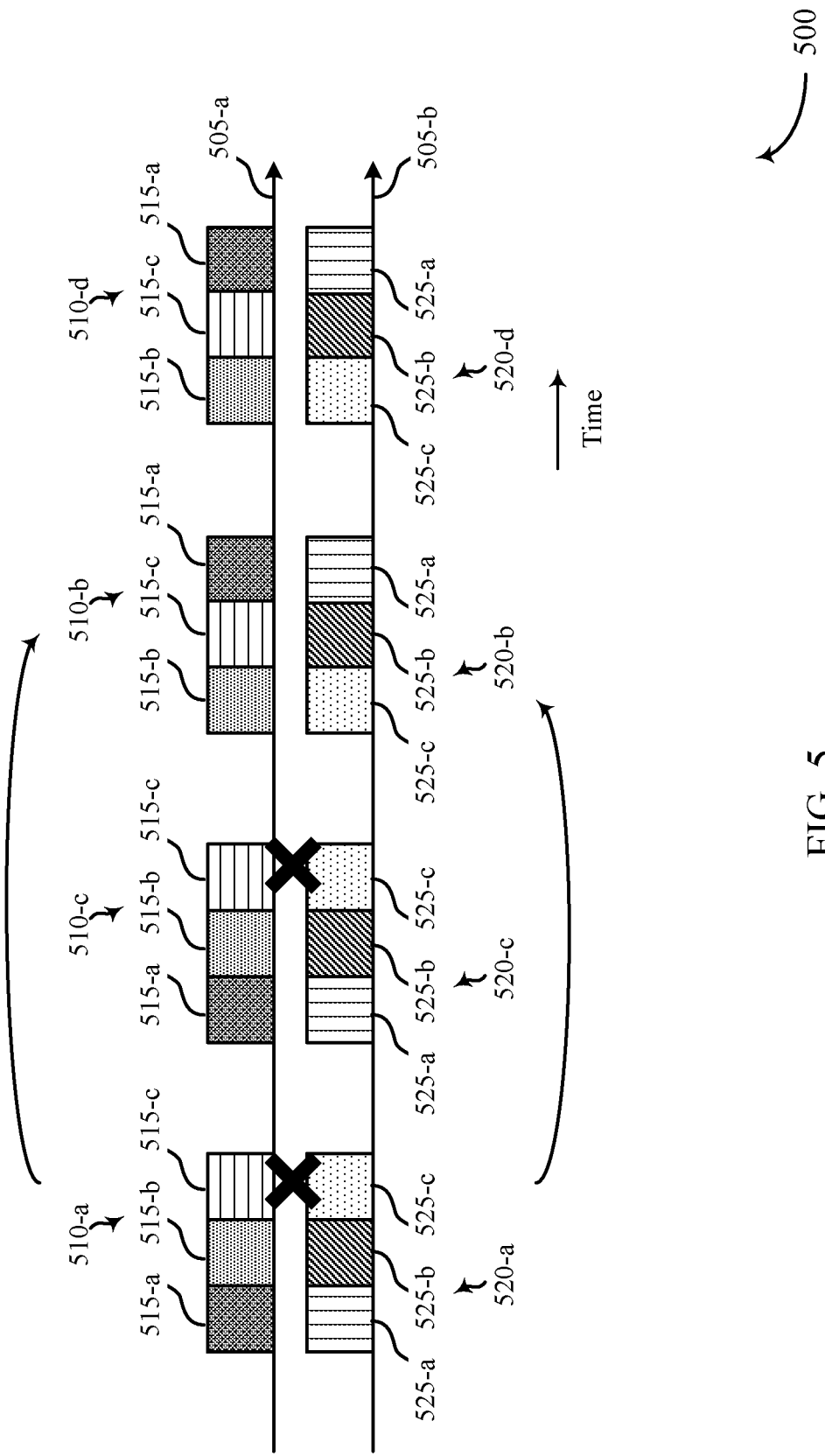

FIG. 5 shows timelines 500 of periodic multi-beam DRS transmissions, by a first base station associated with a first cell and a second base station associated with a second cell, in accordance with various aspects of the present disclosure. The first base station and second base station may be examples of the base stations 105, 205, or 305 described with reference to FIG. 1, 2, or 3. The first cell and the second cell may be cells of a same network operator or different network operators.

A first timeline 505-*a* shows transmission of a plurality of instances 510 of a periodic multi-beam DRS by the first base station. The instances 510 of the periodic multi-beam DRS may include a first instance 510-*a* of the periodic multi-beam DRS, a second instance 510-*b* of the periodic multi-beam DRS, etc. Each instance 510 of the periodic multi-beam DRS may include a DRS transmitted on each beam of a first plurality of beams 515 (e.g., a first beam 515-*a*, a second beam 515-*b*, and a third beam 515-*c*). In the first instance 510-*a* of the periodic multi-beam DRS, the beams 515 may be arranged in a first temporal order (e.g., the first beam 515-*a*, followed by the second beam 515-*b*, followed by the third beam 515-*c*). In the second instance 510-*b* of the periodic multi-beam DRS, the beams 515 may be arranged in a second temporal order (e.g., the second beam 515-*b*, followed by the third beam 515-*c*, followed by the first beam 515-*a*).

A second timeline 505-*b* shows transmission of a plurality of instances 520 of a periodic multi-beam DRS by the second base station. The instances 520 of the periodic multi-beam DRS may include a first instance 520-*a* of the periodic multi-beam DRS, a second instance 520-*b* of the periodic multi-beam DRS, etc. Each instance 520 of the periodic multi-beam DRS may include a DRS transmitted on each beam of a second plurality of beams 525 (e.g., a fourth beam 525-*a*, a fifth beam 525-*b*, and a sixth beam 525-*c*). In the first instance 520-*a* of the periodic multi-beam DRS, the beams 525 may be arranged in a first temporal order (e.g., the first beam 525-*a*, followed by the second beam 525-*b*, followed by the third beam 525-*c*). In the second instance 520-*b* of the periodic multi-beam DRS, the beams 525 may be arranged in a third temporal order (e.g., the third beam 525-*c*, followed by the second beam 525-*b*, followed by the first beam 525-*a*).

By way of example, the temporal order of the first plurality of beams 515 is shown to be permuted, between the first instance 510-*a* and the second instance 510-*b* of the periodic multi-beam DRS transmitted by the first base station, in accordance with a first parameter (e.g., a first beam shift sequence). The second plurality of beams 525 is shown to be permuted, between the first instance 520-*a* and the second instance 520-*b* of the periodic multi-beam DRS transmitted by the second base station, in accordance with a second parameter (e.g., a second beam shift sequence). Thus, if the third beam 515-*c* of the first plurality of beams 515 interferes with reception of the third beam 525-*c* of the second plurality of beams 525, at a location of a UE, when the third beam 515-*c* and the third beam 525-*c* are transmitted at the same time (designated by an X between the timelines 505-*a* and 505-*b*); the permutation of one or both of the first plurality of beams 515 or the second plurality of beams 525 across different instances of a multi-beam DRS, such that the temporal order of the first plurality of beams 515 changes with respect to the temporal order of the second plurality of beams 525, may result in transmissions of the third beam 515-*c* in the absence of the third beam 525-*c* and vice versa. The result may thereby potentially enable the UE to receive the third beam 515-*c* and/or the third beam 525-*c* (and the DRS transmitted thereon).

In some examples, the plurality of instances 510 of the periodic multi-beam DRS transmitted by the first base station may include a third instance 510-*c* of the periodic multi-beam DRS and a fourth instance 510-*d* of the periodic multi-beam DRS. In some examples, each of the third instance 510-*c* and the fourth instance 510-*d* of the periodic multi-beam DRS may include a DRS transmitted on each beam of the first plurality of beams 515; with the first plurality of beams 515 being arranged in accordance with the first temporal order, in the third instance 510-*c*, and with the first plurality of beams 515 being arranged in accordance with the second temporal order, in the fourth instance 510-*d*. Thus, multiple consecutive instances 510 (e.g., M instances) of the periodic multi-beam DRS may be transmitted with the first plurality of beams 515 arranged in accordance with the first temporal order, and then multiple consecutive instances 510 (e.g., M instances) of the periodic multi-beam DRS may be transmitted with the first plurality of beams 515 arranged in accordance with the second temporal order. In other examples, each of the third instance 510-*c* of the periodic multi-beam DRS and the fourth instance 510-*d* of the periodic multi-beam DRS may include a DRS transmitted on each beam of the second plurality of beams 525, or a third plurality of beams; with the respective plurality of beams being arranged in accordance with the first temporal order in the third instance 510-*c*, and with the respective plurality of beams 515 being arranged in accordance with the second temporal order in the fourth instance 510-*d*.

In some examples, the plurality of instances 520 of the periodic multi-beam DRS, transmitted by the second base station, may include a third instance 520-*c* of the periodic multi-beam DRS and a fourth instance 520-*d* of the periodic multi-beam DRS, with each of the third instance 520-*c* and the fourth instance 520-*d* being configured similarly to the third instance 510-*c* and the fourth instance 510-*d* of the periodic multi-beam DRS transmitted by the first base station.

The examples of beam permutations described with reference to FIGS. 4 and 5 are intended to be examples, and in other examples, the same or different sets of beams may be permuted in accordance with the same or different parameters by base stations of the same or different cells.

In some examples, a plurality of instances of a periodic multi-beam DRS, based on a plurality of beams, may be designated DRS(N) and DRS(N+nK); where n=1, 2, 3, etc., and K=1 (i.e., indicating that the instances of the periodic multi-beam DRS are consecutive instances of the periodic multi-beam DRS based on the plurality of beams) or some other integer (i.e., indicating that the instances of the periodic multi-beam DRS are separated by other instances of the periodic multi-beam DRS). In other examples, a plurality of instances of a periodic multi-beam DRS, based on a plurality of beams, may be designated DRS(N) and DRS(N+nMK), where n=1, 2, 3, etc., K=1 or some other integer, and M is a number of times an instance of the periodic multi-beam DRS is repeated based on a plurality of beams arranged in a first temporal order, before the temporal order of the beams is changed to a second temporal order.

A plurality of instances of a periodic multi-beam DRS, designated DRS(N) and DRS(N+nK), may allow for fast interference diversity. A plurality of instances of a periodic multi-beam DRS, designated DRS(N) and DRS(N+nMK), may allow a UE that is having trouble decoding a DRS to combine multiple (e.g., M) instances of the DRS.

In some examples, a network (e.g., a base station) may transmit information identifying one or more (predetermined or arbitrary) temporal orders used to permute a plurality of beams, or may select a temporal order for permuting a plurality of beams from a predetermined set of permutations and/or based on a permutation sequence (e.g., a beam shift sequence).

When a UE receives a DRS, on a beam in an instance of a periodic multi-beam DRS, for the purpose of validating or confirming timing while the UE is in a connected mode with a network (e.g., with a base station), the UE may have received information in the foregoing, identifying temporal orders to permute a plurality of beams within the periodic multi-beam DRS. Based on the received information, the UE may be able to determine the time interval in which the base station will transmit the beam with the DRS. However, when a UE performs an initial acquisition on a primary cell (PCell), the UE may not have received information identifying the temporal orders used by the PCell to permute a plurality of beams within a periodic multi-beam DRS. Thus, there may be scenarios in which the temporal orders used to permute a plurality of beams within a periodic multi-beam DRS may not be known to a UE, and the UE may blindly detect (or may be unable to detect) a particular beam containing a DRS. In some cases, a UE's performance of blind detection of a beam location may be avoided by not permuting the temporal order of beams within a periodic multi-beam DRS of a primary cell, or by transmitting instances of a periodic multi-beam DRS without permutation, in accordance with a first periodicity and timing; and transmitting additional instances of the periodic multi-beam DRS, with permutation, in accordance with a second periodicity and/or timing.

In some examples, a UE that performs a search for a candidate non-primary cell may receive information identifying the temporal orders used by one or more candidate non-primary cells (e.g., to permute a plurality of beams within a periodic multi-beam DRS) from a base station associated with a primary cell for the UE. The UE may then use the received information to determine the time interval in which a candidate non-primary cell may transmit a particular beam, so that the UE may not blindly detect a particular beam containing a DRS.

In some examples, repetitive interference with a DRS included in a periodic multi-beam DRS may be mitigated by encoding a synchronization signal sequence of the DRS based on different codes in different instances of the periodic multi-beam DRS. For example, the synchronization signal of the DRS may be encoded based on a first code in a first instance of the periodic multi-beam DRS, and based on a second code in a second instance of the periodic multi-beam DRS. In some examples, a first base station associated with a first cell may select different codes for encoding the synchronization signal sequence of the DRS based on a first parameter (e.g., a first code sequence), and a second base station associated with a second cell may select different codes for encoding a synchronization signal sequence of a DRS based on a second parameter (e.g., a second code sequence). The first code sequence and the second code sequence may differ, and may be used to generate respective sequences of orthogonal codes. In some examples, the different codes may include different scrambling codes, different orthogonal cover codes (OCCs), or a combination.

Figure 6:
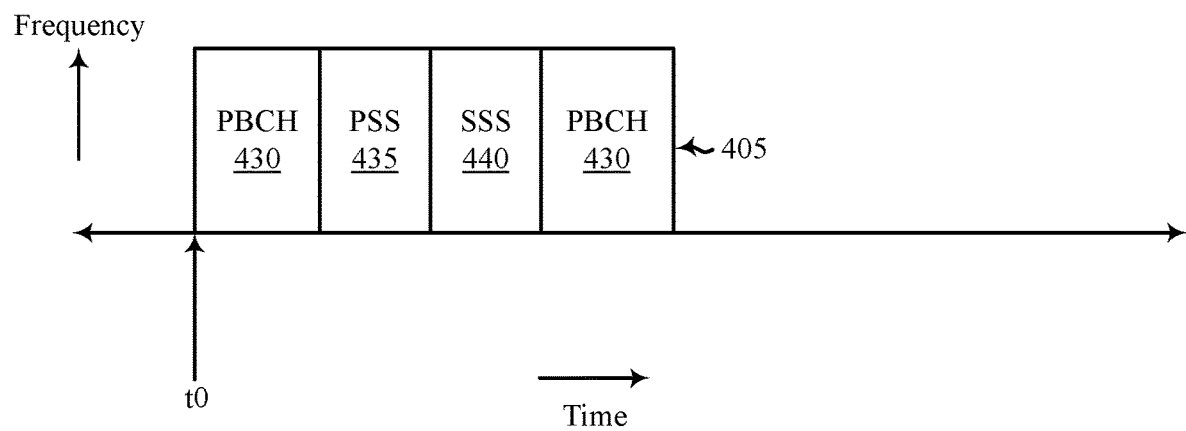
FIG. 6 shows a timeline of a DRS transmission, in accordance with various aspects of the present disclosure.

FIG. 6 shows a timeline 600 of a DRS transmission, in accordance with various aspects of the present disclosure. The DRS transmission may be made by a base station. The base station may be an example of aspects of one or more of the base stations 105, 205, or 305, described with reference to FIG. 1, 2, or 3.

At time t0, the base station may transmit an instance of a DRS 405. The instance of the DRS 405 may be transmitted on a beam over a radio frequency spectrum band (e.g., licensed radio frequency spectrum band, unlicensed radio frequency spectrum band). The instance of the DRS 405 may be a directional portion of an instance of a periodic multi-beam DRS, described with reference to FIG. 2 and other figures.

The instance of the DRS 405 may include a physical broadcast channel (PBCH) 430, a primary synchronization signal (PSS) 435, and a secondary synchronization signal (SSS) 440. In some examples, the PBCH 430 may carry a system frame number, a synchronization signal (SS) block index, a bandwidth indication, random access configuration information (e.g., RACH information), or a minimum system information block (SIB). The timings (or sequential order) of the PBCH 430, the PSS 435, and the SSS 440 may vary. As illustrated, the PBCH 430 may be split into portions located before and after the synchronization signals (i.e., the PSS 435 and SSS 440). As described in more detail in the following (e.g., FIGS. 7 and 8), at least one of the PSS 435 or SSS 440 may encoded using a scrambling code, orthogonal cover code, or other type of code.

Figure 7:
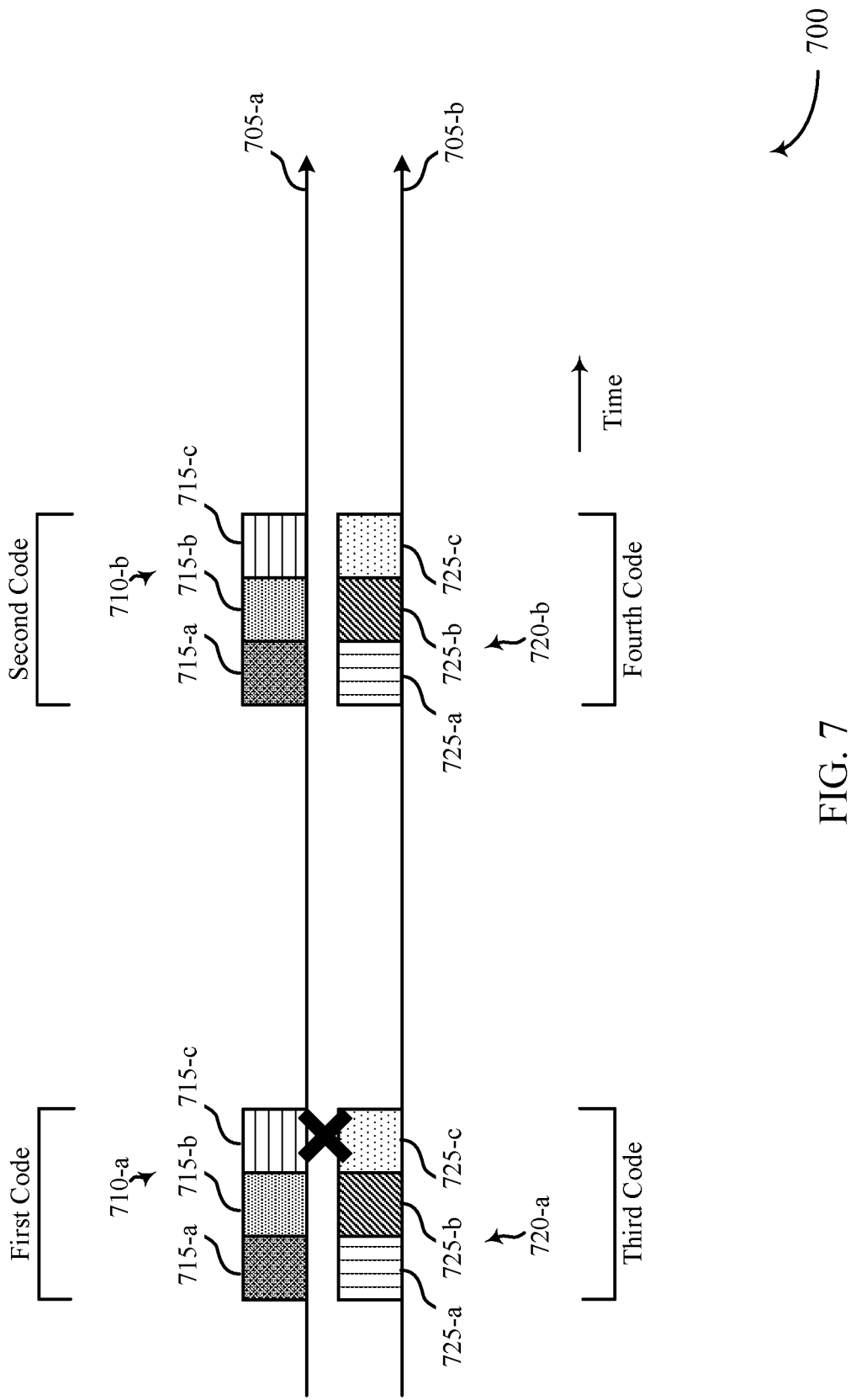
FIGS. 7-8 show timelines of periodic multi-beam transmissions, by a first base station associated with a first cell, and a second base station associated with a second cell, in accordance with various aspects of the present disclosure.

FIG. 7 shows timelines 700 of periodic multi-beam DRS transmissions, by a first base station associated with a first cell and a second base station associated with a second cell, in accordance with various aspects of the present disclosure. The first base station and second base station may be examples of base stations 105, 205, or 305, described with reference to FIG. 1, 2, or 3. The first cell and the second cell may be cells of a same network operator or different network operators.

A first timeline 705-*a* shows transmission of a plurality of instances 710 of a periodic multi-beam DRS by the first base station. The instances 710 may include a first instance 710-*a* of the periodic multi-beam DRS, a second instance 710-b of the periodic multi-beam DRS, etc. Each instance 710 may include a DRS transmitted on each beam of a first plurality of beams 715 (e.g., a first beam 715-a, a second beam 715-b, and a third beam 715-c). In the first instance 710-a of the periodic multi-beam DRS, a DRS transmitted on a beam may include a synchronization signal sequence encoded based on a first code. In the second instance 710-b of the periodic multi-beam DRS, the DRS transmitted on the beam may include the synchronization signal sequence encoded based on a second code.

A second timeline 705-b shows transmission of a plurality of instances 720 of a periodic multi-beam DRS by the second base station. The instances 720 include a first instance 720-a of the periodic multi-beam DRS, a second instance 720-b of the periodic multi-beam DRS, etc. Each instance 720 may include a DRS transmitted on each beam of a second plurality of beams 725 (e.g., a fourth beam 725-a, a fifth beam 725-b, and a sixth beam 725-c). In the first instance 720-a of the periodic multi-beam DRS, a DRS transmitted on a beam may include a synchronization signal sequence encoded based on a third code (or the second code). In the second instance 710-b of the periodic multi-beam DRS, the DRS transmitted on the beam may include the synchronization signal sequence encoded based on a fourth code (or the first code).

By way of example, the codes used to encode the synchronization signal sequence of the DRS transmitted on the beam in each instance of the periodic multi-beam DRS transmitted by the first base station may be generated based on a first parameter (e.g., a first code sequence). Similarly, the codes used to encode the synchronization signal sequence of the DRS transmitted on the beam in each instance of the periodic multi-beam DRS transmitted by the second base station may be generated based on a second parameter (e.g., a second code sequence). The first code sequence and the second code sequence may differ, and may be used to generate respective sequences of orthogonal codes. In some examples, the different codes may include different scrambling codes, different OCCs, or a combination.

Figure 8:
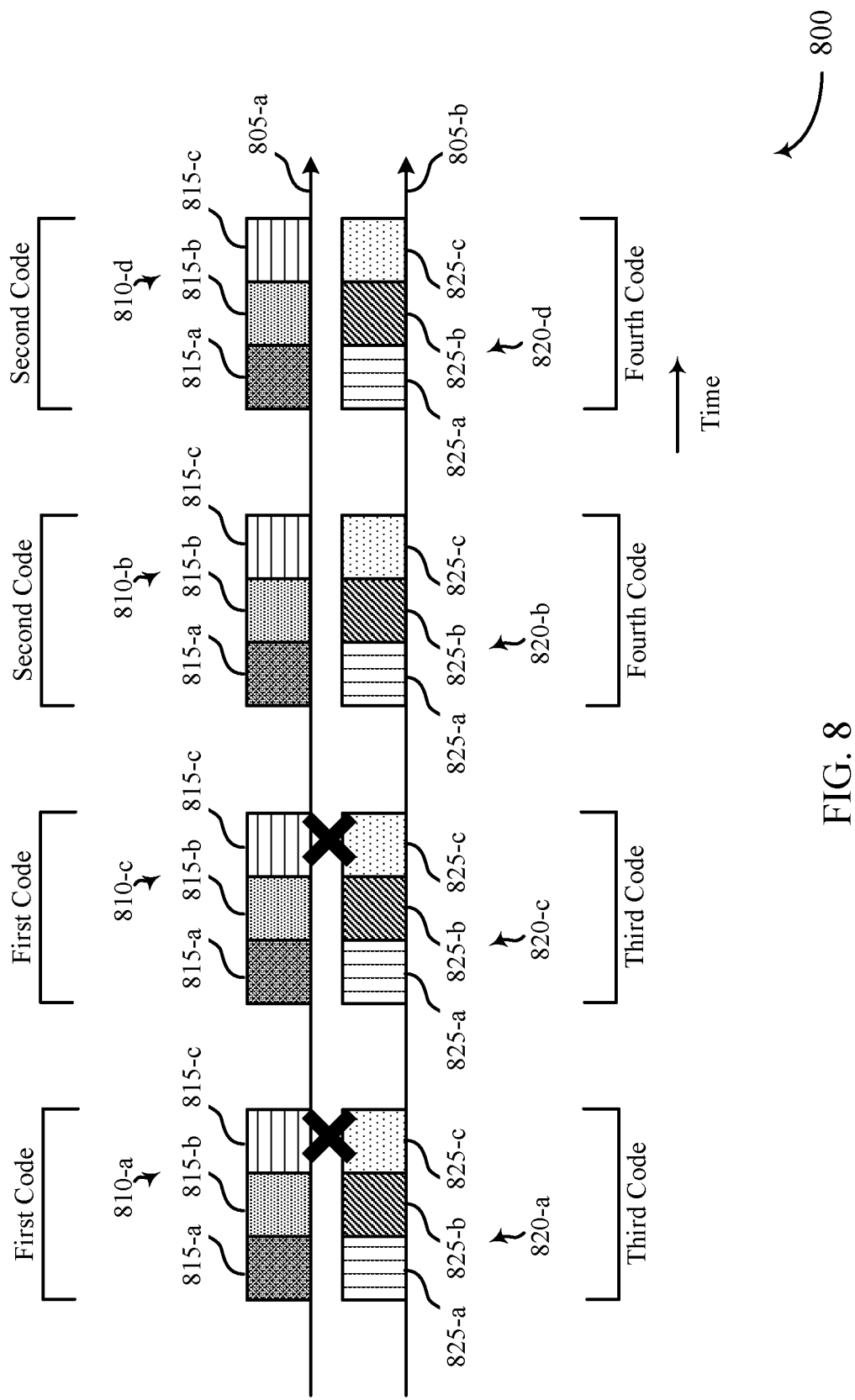

FIG. 8 shows timelines 800 of periodic multi-beam DRS transmissions, by a first base station associated with a first cell and a second base station associated with a second cell, in accordance with various aspects of the present disclosure. The first base station and second base station may be examples of base stations 105, 205, or 305, described with reference to FIG. 1, 2, or 3. The first cell and the second cell may be cells of a same network operator or different network operators.

A first timeline 805-a shows transmission of a plurality of instances 810 of a periodic multi-beam DRS by the first base station. The instances 810 may include a first instance 810-a of the periodic multi-beam DRS, a second instance 810-b of the periodic multi-beam DRS, etc. Each instance 810 may include a DRS transmitted on each beam of a first plurality of beams 815 (e.g., a first beam 815-a, a second beam 815-b, and a third beam 815-c). In the first instance 810-a of the periodic multi-beam DRS, a DRS transmitted on a beam may include a synchronization signal sequence encoded based on a first code. In the second instance 810-b of the periodic multi-beam DRS, the DRS transmitted on the beam may include the synchronization signal sequence encoded based on a second code.

A second timeline 805-b shows transmission of a plurality of instances 820 of a periodic multi-beam DRS by the second base station. The instances 820 may include a first instance 820-a of the periodic multi-beam DRS, a second instance 820-b of the periodic multi-beam DRS, etc. Each instance 820 may include a DRS transmitted on each beam of a second plurality of beams 825 (e.g., a fourth beam 825-a, a fifth beam 825-b, and a sixth beam 825-c). In the first instance 820-a of the periodic multi-beam DRS, a DRS transmitted on a beam may include a synchronization signal sequence encoded based on a third code (or the second code). In the second instance 810-b of the periodic multi-beam DRS, the DRS transmitted on the beam may include the synchronization signal sequence encoded based on a fourth code (or the first code).

By way of example, the codes used to encode the synchronization signal sequence of the DRS transmitted on the beam in each instance of the periodic multi-beam DRS transmitted by the first base station may be generated based on a first parameter (e.g., a first code sequence). Similarly, the codes used to encode the synchronization signal sequence of the DRS transmitted on the beam in each instance of the periodic multi-beam DRS transmitted by the second base station may be generated based on a second parameter (e.g., a second code sequence). The first code sequence and the second code sequence may differ, and may be used to generate respective sequences of orthogonal codes. In some examples, the different codes may include different scrambling codes, different OCCs, or a combination.

In some examples, the plurality of instances 810 of the periodic multi-beam DRS transmitted by the first base station may include a third instance 810-c of the periodic multi-beam DRS and a fourth instance 810-d of the periodic multi-beam DRS. In some examples, each of the third instance 810-c and the fourth instance 810-d of the periodic multi-beam DRS may include a DRS transmitted on each beam of the first plurality of beams 815, with the DRS transmitted on the beam in the third instance 810-c including the synchronization signal sequence encoded based on the first code, and with the DRS transmitted on the beam in the fourth instance 810-d including the synchronization signal sequence encoded based on the code. Thus, a first set of multiple consecutive instances 810 (e.g., M instances) of the periodic multi-beam DRS may include the DRS with the synchronization signal sequence encoded based on the first code; and a second set of multiple consecutive instances 810 (e.g., M instances) of the periodic multi-beam DRS may include the DRS with the synchronization signal sequence encoded based on the second code. In other examples, each of the third instance 810-c and the fourth instance 810-d of the periodic multi-beam DRS may include a DRS transmitted on each beam of the second plurality of beams 825 or a third plurality of beams.

In some examples, the plurality of instances 820 of the periodic multi-beam DRS transmitted by the second base station may include a third instance 820-c and a fourth instance 820-d of the periodic multi-beam DRS, with each of the third instance 820-c and the fourth instance 820-d of the being configured similarly to the third instance 810-c and the fourth instance 810-d of the periodic multi-beam DRS transmitted by the first base station. Further, the examples of synchronization signal sequence encoding described with reference to FIGS. 7 and 8 are intended to be examples, and in other examples, the same or different sets of beams may be permuted in accordance with the same or different parameters by base stations of the same or different cells.

In some examples, a plurality of instances of a periodic multi-beam DRS, based on a plurality of beams, may be designated DRS(N) and DRS(N+nK), where n=1, 2, 3, etc., and K=1 (i.e., indicating that the instances of the periodic multi-beam DRS are consecutive instances of the periodic multi-beam DRS based on the plurality of beams) or some other integer (i.e., indicating that the instances of the periodic multi-beam DRS are separated by other instances of the periodic multi-beam DRS). In other examples, a plurality of instances of a periodic multi-beam DRS, based on a plurality of beams, may be designated DRS(N) and DRS(N+nMK), where n=1, 2, 3, etc., K=1 or some other integer, and M is representative of a number of instances where the periodic multi-beam DRS may be repeated with a DRS. The DRS may have a synchronization signal sequence encoded based on a first code, before an instance of the periodic multi-beam DRS is transmitted with a DRS having the synchronization signal sequence encoded based at on a second code.

A plurality of instances of a periodic multi-beam DRS, designated DRS(N) and DRS(N+nK), may allow for fast interference diversity. A plurality of instances of a periodic multi-beam DRS, designated DRS(N) and DRS(N+nMK), may allow a UE that is having trouble decoding a DRS to combine multiple (e.g., M) instances of the DRS.

In some examples, a network (e.g., a base station) may transmit information identifying one or more (predetermined or arbitrary) codes used to encode a synchronization signal sequence of a DRS, or may select a code for encoding a synchronization signal sequence of a DRS from a predetermined set of codes and/or based on a code sequence.

In some examples, a UE may not know the temporal order used to transmit a plurality of beams within an instance of a periodic multi-beam DRS, or a UE may not know the code used to encode a synchronization signal sequence within a DRS of a periodic multi-beam DRS. In these examples, the UE may blindly detect the temporal orders or codes. If the temporal orders or codes are selected from a fixed set of temporal orders or codes, the temporal orders or codes may correspond to predetermined sets of one or more information bits; and detection of at least one of the temporal orders or codes may convey a predetermined set of one or more information bits. By transmitting different instances of a periodic multi-beam DRS with a plurality of beams arranged in different temporal orders; or by encoding a synchronization signal sequence of a DRS using different codes in different instances of a periodic multi-beam DRS, different sets of one or more information bits may be conveyed to a UE in different instances of a periodic multi-beam DRS. For example, in some instances, a temporal order i or code i may convey a bit value of 1, while a temporal order j or code j may convey a bit value of 0. In some examples, the sets of one or more information bits may include at least a part of a cell identifier, at least a portion of timing information for a cell, at least a part of a system frame number, or a combination.

Figure 9:
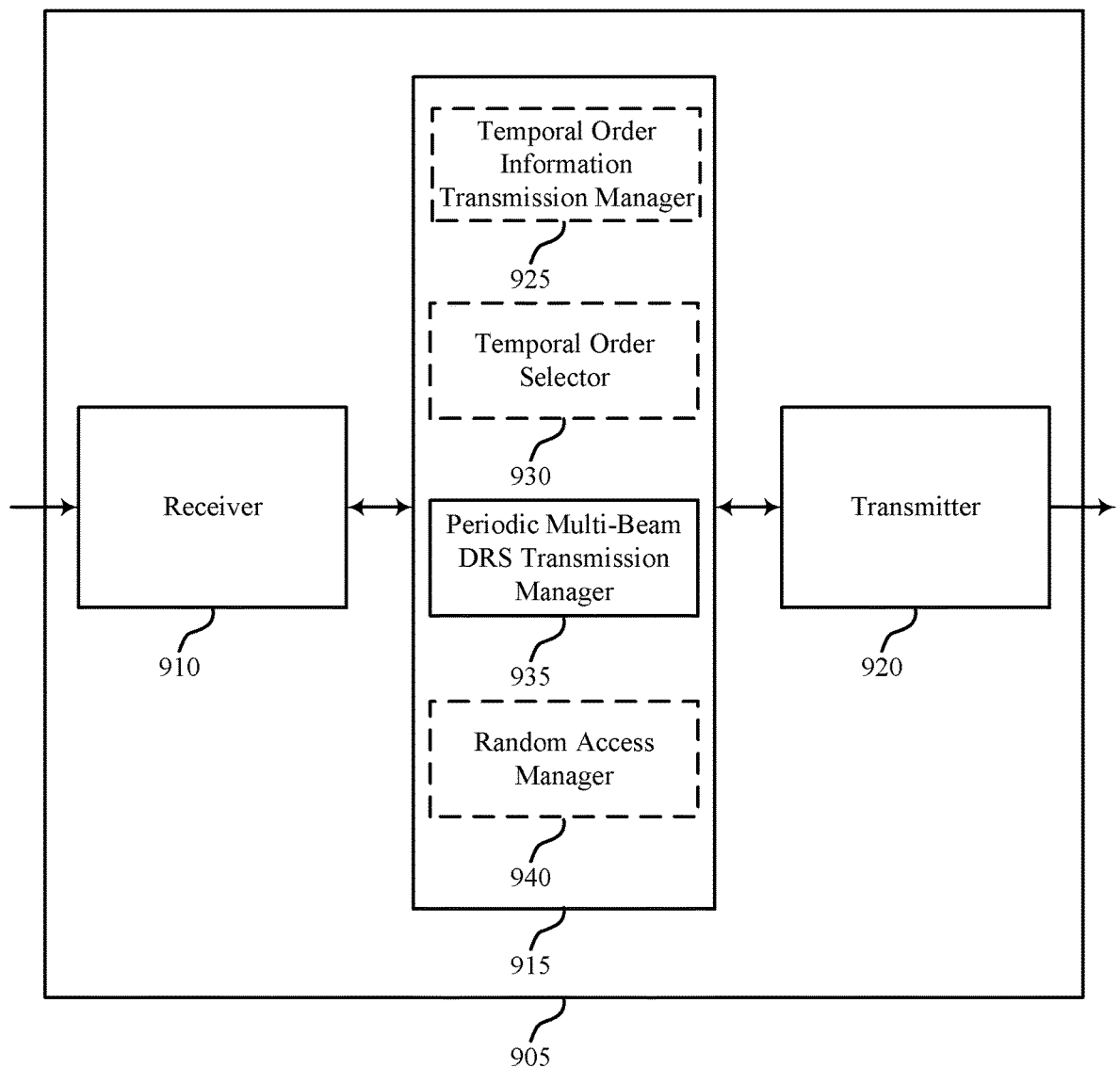
FIGS. 9-12 show block diagrams of apparatuses for use in wireless communication, in accordance with various aspects of the present disclosure.

FIG. 9 shows a block diagram 900 of an apparatus 905 for use in wireless communication, in accordance with various aspects of the present disclosure. The apparatus 905 may be an example of aspects of base station 105, 205, or 305, described with reference to FIG. 1, 2, or 3. The apparatus 905 may include a receiver 910, a wireless communication manager 915, and a transmitter 920. The apparatus 905 may also include a processor. Each of the components may be in communication with one another (e.g., via one or more buses).

Receiver 910 may receive data or control signals or information (i.e., transmissions), some or all of the aforementioned may be associated with various information channels (e.g., data channels, control channels, etc.). Received signals or information, or measurements performed thereon, may be passed to other components of the apparatus 905. The receiver 910 may include a single antenna or a plurality of antennae.

Wireless communication manager 915 and/or at least some of the various sub-components of wireless communication manager 915 may be implemented in hardware, software executed by a processor, firmware, or any combination. If implemented in software executed by a processor, the functions of the wireless communication manager 915 and/or at least some of the various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination designed to perform the functions described in the present disclosure.

The wireless communication manager 915 and/or at least some of the various sub-components may be physically located at various positions, including being distributed such that portions of functions are implemented at different physical locations by one or more physical devices. In some examples, the wireless communication manager 915 and/or at least some of the various sub-components may be a separate and distinct component in accordance with various aspects of the present disclosure. In other examples, the wireless communication manager 915 and/or at least some of the various sub-components may be combined with one or more other hardware components, including but not limited to an I/O component, a transceiver, another computing device, one or more other components described in the present disclosure, or a combination, in accordance with various aspects of the present disclosure. The wireless communication manager 915 may include an optional temporal order information manager 925, an optional temporal order selector 930, a periodic multi-beam DRS transmission manager 935, and/or an optional random access manager 940.

The temporal order information manager 925 may be used to transmit information identifying at least one temporal order (e.g., a first temporal order or a second temporal order), as described for example with reference to FIG. 4 or 5.

The periodic multi-beam DRS transmission manager 935 may be used to transmit, on a plurality of beams, a DRS in a first instance of a periodic multi-beam DRS, as described for example with reference to FIG. 4 or 5. The first instance of the periodic multi-beam DRS may include the plurality of beams arranged in the first temporal order. The periodic multi-beam DRS transmission manager 935 may also be used to transmit, on the plurality of beams, the DRS in a second instance of the periodic multi-beam DRS. The second instance of the periodic multi-beam DRS may include the plurality of beams arranged in a second temporal order that is different from the first temporal order.

The random access manager 940 may be used to perform at least one random access procedure with at least one UE based on the periodic multi-beam DRS, as described for example with reference to FIG. 4 or 5.

In some examples of the apparatus 905, periodic multi-beam DRS transmission manager 935 may be used to transmit the DRS on a beam in each instance of a plurality of instances of the periodic multi-beam DRS. The plurality of instances of the periodic multi-beam DRS may include the first instance of the periodic multi-beam DRS and the second instance of the periodic multi-beam DRS. In some examples, the first instance of the periodic multi-beam DRS and the second instance of the periodic multi-beam DRS may be consecutive instances based on the plurality of beams. Consecutive instances based on the plurality of beams may or may not be interspersed with one or more instances (of the periodic multi-beam DRS) based on one or more other pluralities of beams.

In some examples of the apparatus 905, the periodic multi-beam DRS transmission manager 935 may be used to transmit the DRS on a beam in each instance of a plurality of instances of the periodic multi-beam DRS. The plurality of instances of the periodic multi-beam DRS may include the first instance of the periodic multi-beam DRS, but not the second instance of the periodic multi-beam DRS. Each instance in the plurality of instances may include the plurality of beams arranged in the first temporal order. In some examples, the plurality of instances of the periodic multi-beam DRS may include consecutive instances based on the plurality of beams.

In some examples of the apparatus 905, temporal order selector 930 may be used to select the first temporal order based on a set of one or more information bits to be conveyed by the DRS on a beam in the first instance of the periodic multi-beam DRS. Similarly, temporal order selector 930 may be used to select the second temporal order based on a set of one or more information bits to be conveyed by the DRS on the beam in the second instance of the periodic multi-beam DRS. In some examples, the one or more information bits may include at least a part of a cell identifier, at least a portion of timing information for a cell, at least a part of a system frame number, or a combination.

The transmitter 920 may transmit data or control signals or information (i.e., transmissions) generated by other components of the apparatus 905, some or all of which may be associated with various information channels (e.g., data channels, control channels, etc.). In some examples, the transmitter 920 may be collocated with the receiver 910 in a transceiver. For example, the transmitter 920 and receiver 910 may be an example of aspects of the transceiver(s) 1350 described with reference to FIG. 13. The transmitter 920 may include a single antenna or a plurality of antennae.

Figure 10:
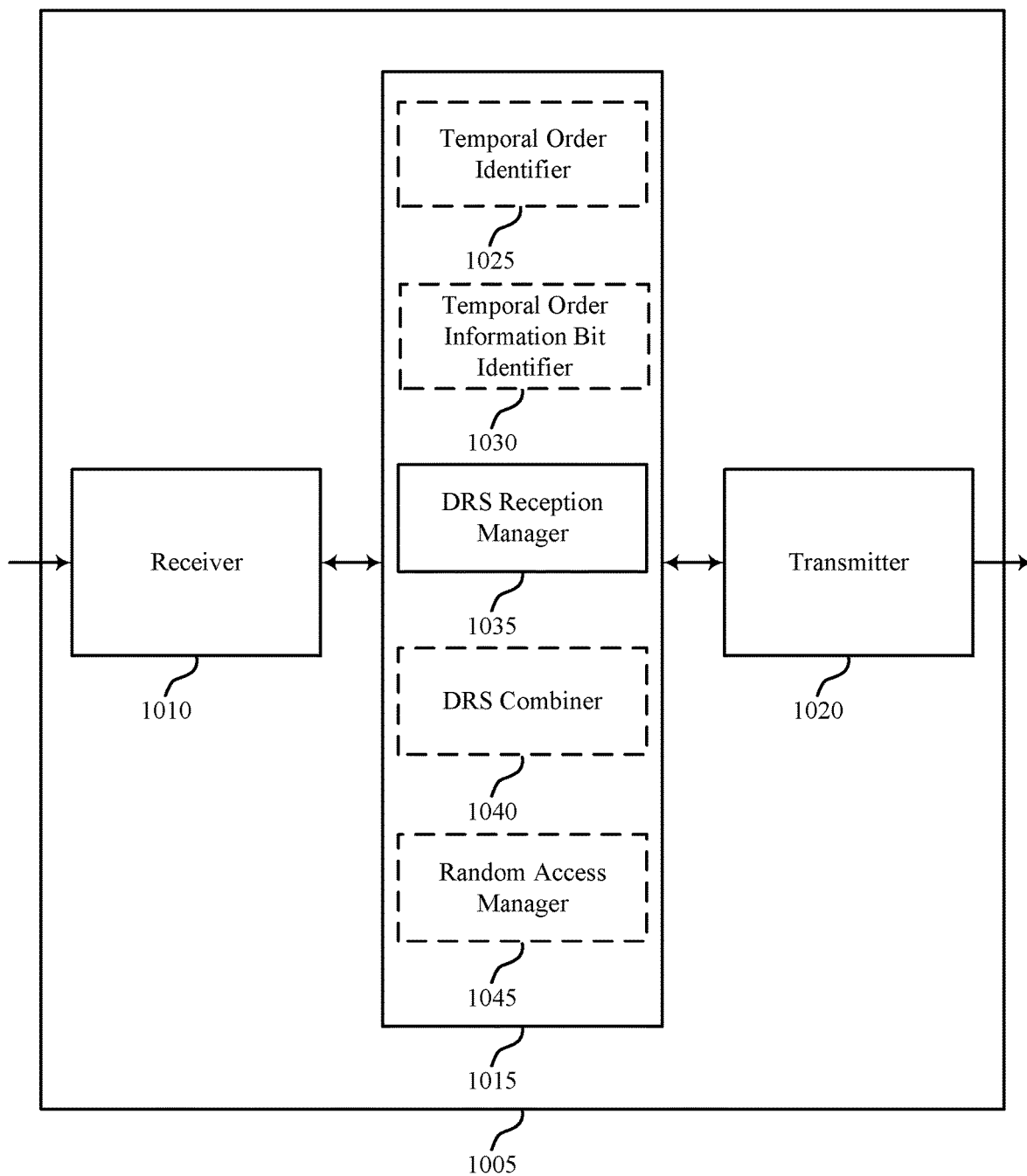

FIG. 10 shows a block diagram 1000 of an apparatus 1005 for use in wireless communication, in accordance with various aspects of the present disclosure. The apparatus 1005 may be an example of aspects of a UE described with reference to FIG. 1, 2, or 3. The apparatus 1005 may include a receiver 1010, a wireless communication manager 1015, and a transmitter 1020. The apparatus 1005 may also include a processor. Each of these components may be in communication with one another (e.g., via one or more buses).

The receiver 1010 may receive data or control signals or information (i.e., transmissions), some or all of which may be associated with various information channels (e.g., data channels, control channels, etc.). Received signals or information, or measurements performed thereon, may be passed to other components of the apparatus 1005. The receiver 1010 may include a single antenna or a plurality of antennae.

The wireless communication manager 1015 and/or at least some of its various sub-components may be implemented in hardware, software executed by a processor, firmware, or any combination. If implemented in software executed by a processor, the functions of the wireless communication manager 1015 and/or at least some of its various sub-components may be executed by a general-purpose processor, a DSP, an ASIC, a FPGA or other programmable logic device, discrete gate or transistor logic, discrete hardware components, or any combination designed to perform the functions described in the present disclosure.

The wireless communication manager 1015 and/or at least some of its various sub-components may be physically located at various positions, including being distributed such that portions of functions are implemented at different physical locations by one or more physical devices. In some examples, the wireless communication manager 1015 and/or at least some of its various sub-components may be a separate and distinct component in accordance with various aspects of the present disclosure. In other examples, the wireless communication manager 1015 and/or at least some of its various sub-components may be combined with one or more other hardware components, including but not limited to an I/O component, a transceiver, another computing device, one or more other components described in the present disclosure, or a combination, in accordance with various aspects of the present disclosure. The wireless communication manager 1015 may include an optional temporal order identifier 1025, an optional temporal order information bit identifier 1030, a DRS reception manager 1035, an optional DRS combiner 1040, and/or an optional random access manager 1045.

The temporal order identifier 1025 may be used to identify at least one of a first temporal order or a second temporal order used to permute a plurality of beams included in a periodic multi-beam DRS, as described for example with reference to FIG. 4 or 5. The first temporal order or second temporal order may be identified based on first information stored at the UE, second information received from a base station, third information received from a second base station, blind detection, or a combination. The second temporal order may be different from the first temporal order.

The DRS reception manager 1035 may be used to receive on a beam of the plurality of beams, from the base station, a DRS in a first instance of a periodic multi-beam DRS, as described for example with reference to FIG. 4 or 5. The first instance of the periodic multi-beam DRS may include the plurality of beams arranged in the first temporal order. A second instance of the periodic multi-beam DRS may include the plurality of beams arranged in the second temporal order.

The random access manager 1045 may be used to perform a random access procedure with the base station based on the DRS, as described for example with reference to FIG. 4 or 5.

In some examples of the apparatus 1005, the DRS reception manager 1035 may be used to receive the DRS on the beam of the plurality of beams, from the base station, in each instance of a plurality of instances of a periodic multi-beam DRS, as described for example with reference to FIG. 4 or 5. The plurality of instances of the periodic multi-beam DRS may include the first instance of the periodic multi-beam DRS and the second instance of the periodic multi-beam DRS. In some examples, the first instance of the periodic multi-beam DRS and the second instance of the periodic multi-beam DRS may be consecutive instances based on the plurality of beams. Consecutive instances based on the plurality of beams may or may not be interspersed with one or more instances (of the periodic multi-beam DRS) based on one or more other pluralities of beams.

In some examples of the apparatus 1005, the DRS reception manager 1035 may be used to receive the DRS on the beam of the plurality of beams, from the base station, in each instance of a plurality of instances of a periodic multi-beam DRS, as described for example with reference to FIG. 4 or 5. The plurality of instances of the periodic multi-beam DRS may include at least the first instance of the periodic multi-beam DRS, and each instance in the plurality of instances of the periodic multi-beam DRS may include the plurality of beams arranged in the first temporal order. The second instance of the periodic multi-beam DRS may not be included in the plurality of instances that includes the first instance. In some examples, the plurality of instances of the periodic multi-beam DRS may be consecutive instances based on the plurality of beams.

In some examples of the apparatus 1005, the DRS combiner 1040 may be used to combine the DRS across multiple instances of the plurality of instances of the periodic multi-beam DRS, as described for example with reference to FIG. 5.

In some examples of the apparatus 1005, the temporal order identifier 1025 may be used to receive, from a first base station associated with a primary cell for the UE, information identifying at least one of a first temporal order or a second temporal order used by a candidate non-primary cell (for the UE) to permute a plurality of beams included in a periodic multi-beam DRS. The second temporal order may be different from the first temporal order. In these examples, the DRS reception manager 1035 may be used to receive on the beam of the plurality of beams, from a second base station associated with the candidate non-primary cell, a DRS in a first instance of the periodic multi-beam DRS. The DRS may be received from the second base station based on the information received from the first base station at block 1905.

In some examples of the apparatus 1005, the temporal order identifier 1025 may be used to blindly detect the first temporal order, as described for example with reference to FIG. 4 or 5. In these examples, the temporal order information bit identifier 1030 may be used to identify a set of one or more information bits based on the first temporal order. In some examples, the set of one or more information bits may include at least a part of a cell identifier, at least a portion of timing information for a cell, at least a part of a system frame number, or a combination.

The transmitter 1020 may transmit data or control signals or information (i.e., transmissions) generated by other components of the apparatus 1005, some or all of which may be associated with various information channels (e.g., data channels, control channels, etc.). In some examples, the transmitter 1020 may be collocated with the receiver 1010 in a transceiver. For example, the transmitter 1020 and receiver 1010 may be an example of aspects of the transceiver(s) 1430 described with reference to FIG. 14. The transmitter 1020 may include a single antenna or a plurality of antennae.

Figure 11:
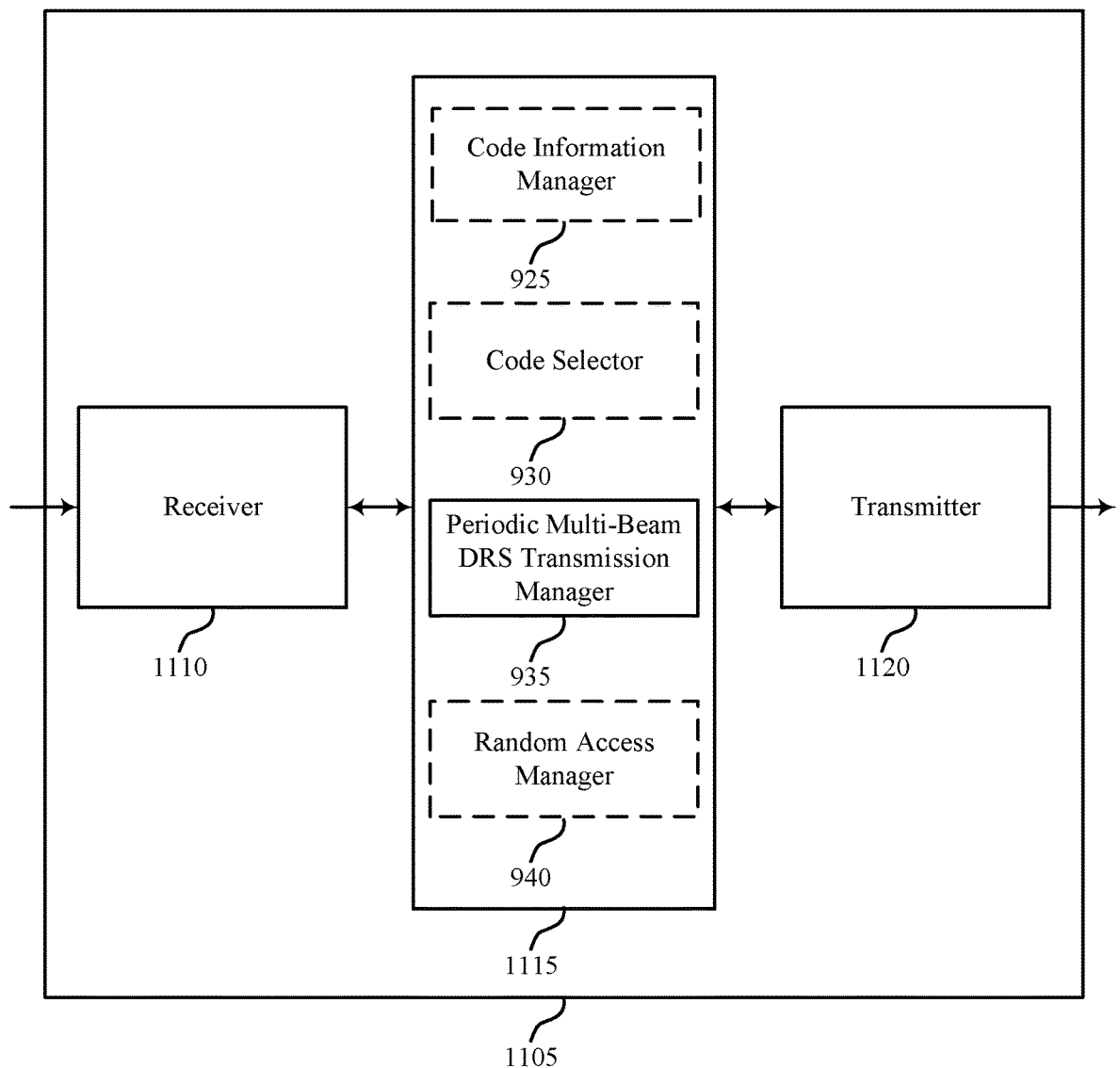

FIG. 11 shows a block diagram 1100 of an apparatus 1105 for use in wireless communication, in accordance with various aspects of the present disclosure. The apparatus 1105 may be an example of aspects of a base station described with reference to FIG. 1, 2, or 3. The apparatus 1105 may include a receiver 1110, a wireless communication manager 1115, and a transmitter 1120. The apparatus 1105 may also include a processor. Each of these components may be in communication with one another (e.g., via one or more buses).

The receiver 1110 may receive data or control signals or information (i.e., transmissions), some or all of which may be associated with various information channels (e.g., data channels, control channels, etc.). Received signals or information, or measurements performed thereon, may be passed to other components of the apparatus 1105. The receiver 1110 may include a single antenna or a plurality of antennae.

The wireless communication manager 1115 and/or at least some of its various sub-components may be implemented in hardware, software executed by a processor, firmware, or any combination. If implemented in software executed by a processor, the functions of the wireless communication manager 1115 and/or at least some of its various sub-components may be executed by a general-purpose processor, a DSP, an ASIC, a FPGA or other programmable logic device, discrete gate or transistor logic, discrete hardware components, or any combination designed to perform the functions described in the present disclosure.

The wireless communication manager 1115 and/or at least some of its various sub-components may be physically located at various positions, including being distributed such that portions of functions are implemented at different physical locations by one or more physical devices. In some examples, the wireless communication manager 1115 and/or at least some of its various sub-components may be a separate and distinct component in accordance with various aspects of the present disclosure. In other examples, the wireless communication manager 1115 and/or at least some of its various sub-components may be combined with one or more other hardware components, including but not limited to an I/O component, a transceiver, another computing device, one or more other components described in the present disclosure, or a combination, in accordance with various aspects of the present disclosure. The wireless communication manager 1115 may include an optional code information manager 1125, an optional code selector 1130, a periodic multi-beam DRS transmission manager 1135, and/or an optional random access manager 1140.

The code information manager 1125 may be used to transmit information identifying at least one code (e.g., a first code or a second code), as described for example with reference to FIG. 4 or 5. The second code may be different from the first code. In some examples, the at least one code may include a scrambling code, an orthogonal cover code, or a combination.

The periodic multi-beam DRS transmission manager 1135 may be used to transmit, on a plurality of beams, a DRS in a first instance of a periodic multi-beam DRS, as described for example with reference to FIG. 7 or 8. The DRS in the first instance of the periodic multi-beam DRS may include a synchronization signal sequence encoded based on a first code. The periodic multi-beam DRS transmission manager 1135 may also be used to transmit, on the plurality of beams, the DRS in a second instance of the periodic multi-beam DRS. The DRS in the second instance of the periodic multi-beam DRS may include the synchronization signal sequence encoded based on a second code.

The random access manager 1140 may be used to perform at least one random access procedure with at least one UE based on the periodic multi-beam DRS, as described for example with reference to FIG. 4 or 5.

In some examples of the apparatus 1105, the periodic multi-beam DRS transmission manager 1135 may be used to transmit the DRS on a beam in each instance of a plurality of instances of the periodic multi-beam DRS, and the plurality of instances of the periodic multi-beam DRS may include the first instance of the periodic multi-beam DRS and the second instance of the periodic multi-beam DRS. In some examples, the first instance of the periodic multi-beam DRS and the second instance of the periodic multi-beam DRS may be consecutive instances based on the plurality of beams. Consecutive instances based on the plurality of beams may or may not be interspersed with one or more instances (of the periodic multi-beam DRS) based on one or more other pluralities of beams.

In some examples of the apparatus 1105, the periodic multi-beam DRS transmission manager 1135 may be used to transmit the DRS on a beam in each instance of a plurality of instances of the periodic multi-beam DRS, and the plurality of instances of the periodic multi-beam DRS may include the first instance of the periodic multi-beam DRS, but not the second instance of the periodic multi-beam DRS. Each instance in the plurality of instances may include the DRS with the synchronization signal sequence encoded based on the first code. In some examples, the plurality of instances of the periodic multi-beam DRS may include consecutive instances based on the plurality of beams.

In some examples of the apparatus 1105, the code selector 1130 may be used to select the first code based on a set of one or more information bits to be conveyed by the DRS on a beam in the first instance of the periodic multi-beam DRS. Similarly, the code selector 1130 may be used to select the second code based on a set of one or more information bits to be conveyed by the DRS on the beam in the second instance of the periodic multi-beam DRS. In some examples, the one or more information bits may include at least a part of a cell identifier, at least a portion of timing information for a cell, at least a part of a system frame number, or a combination.

The transmitter 1120 may transmit data or control signals or information (i.e., transmissions) generated by other components of the apparatus 1105, some or all of which may be associated with various information channels (e.g., data channels, control channels, etc.). In some examples, the transmitter 1120 may be collocated with the receiver 1110 in a transceiver. For example, the transmitter 1120 and receiver 1110 may be an example of aspects of the transceiver(s) 1350 described with reference to FIG. 13. The transmitter 1120 may include a single antenna or a plurality of antennae.

Figure 12:
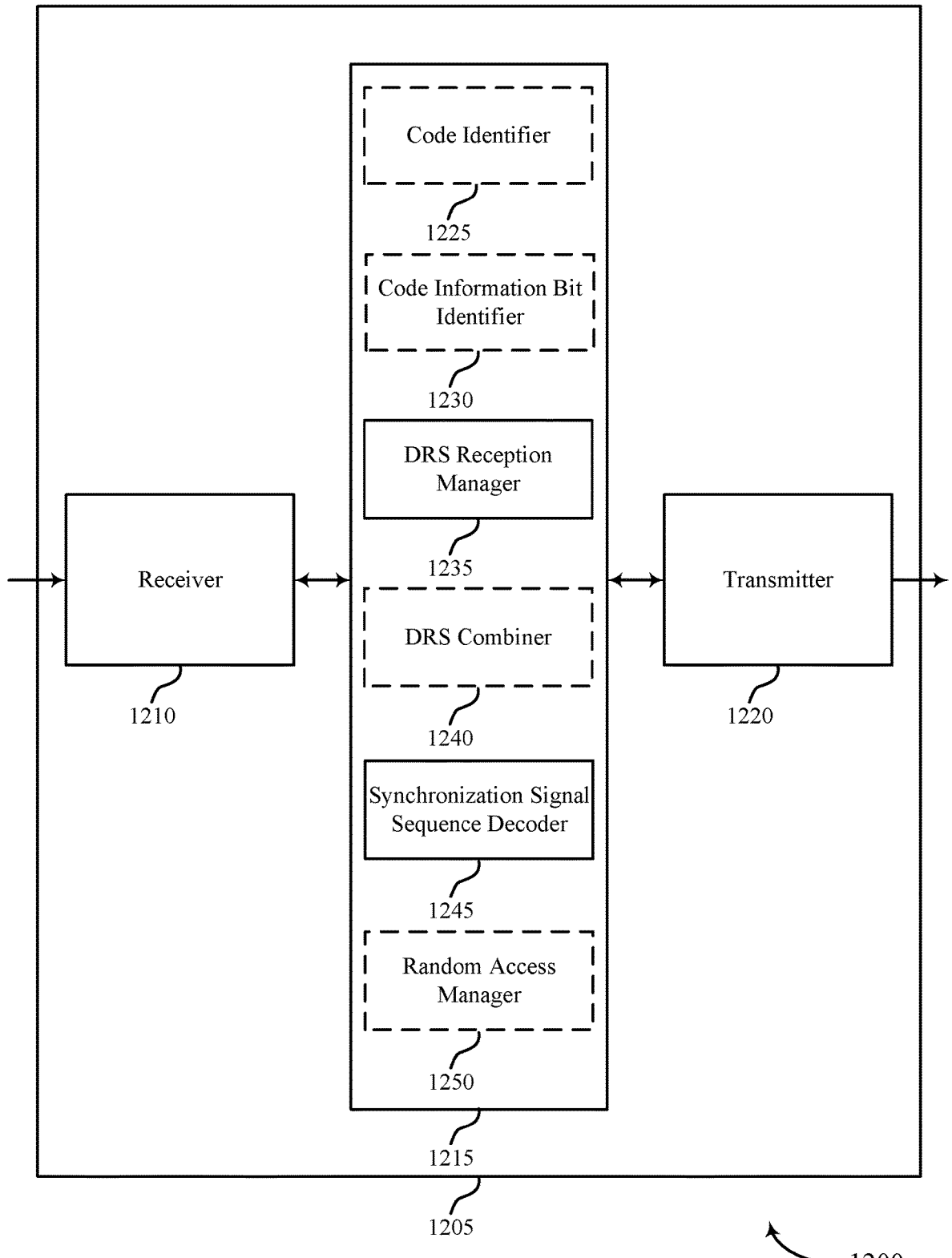

FIG. 12 shows a block diagram 1200 of an apparatus 1205 for use in wireless communication, in accordance with various aspects of the present disclosure. The apparatus 1205 may be an example of aspects of a UE described with reference to FIG. 1, 2, or 3. The apparatus 1205 may include a receiver 1210, a wireless communication manager 1215, and a transmitter 1220. The apparatus 1205 may also include a processor. Each of these components may be in communication with one another (e.g., via one or more buses).

The receiver 1210 may receive data or control signals or information (i.e., transmissions), some or all of which may be associated with various information channels (e.g., data channels, control channels, etc.). Received signals or information, or measurements performed thereon, may be passed to other components of the apparatus 1205. The receiver 1210 may include a single antenna or a plurality of antennae.

The wireless communication manager 1215 and/or at least some of its various sub-components may be implemented in hardware, software executed by a processor, firmware, or any combination. If implemented in software executed by a processor, the functions of the wireless communication manager 1215 and/or at least some of its various sub-components may be executed by a general-purpose processor, a DSP, an ASIC, a FPGA or other programmable logic device, discrete gate or transistor logic, discrete hardware components, or any combination designed to perform the functions described in the present disclosure.

The wireless communication manager 1215 and/or at least some of its various sub-components may be physically located at various positions, including being distributed such that portions of functions are implemented at different physical locations by one or more physical devices. In some examples, the wireless communication manager 1215 and/or at least some of its various sub-components may be a separate and distinct component in accordance with various aspects of the present disclosure. In other examples, the wireless communication manager 1215 and/or at least some of its various sub-components may be combined with one or more other hardware components, including but not limited to an I/O component, a transceiver, another computing device, one or more other components described in the present disclosure, or a combination, in accordance with various aspects of the present disclosure. The wireless communication manager 1215 may include an optional code identifier 1225, an optional code information bit identifier 1230, a DRS reception manager 1235, an optional DRS combiner 1240, a synchronization signal sequence decoder 1245, and/or an optional random access manager 1250.

The code identifier 1225 may be used to identify at least one of a first code or a second code used to encode a synchronization signal sequence of a DRS included in an instance of a periodic multi-beam DRS, as described for example with reference to FIG. 7 or 7. The first code or second code may be identified based on first information stored at the UE, second information received from a base station, third information received from a second base station, blind detection, or a combination. The first code or the second code may include a scrambling code, an orthogonal cover code, or a combination. The second code may be different from the first code.

The DRS reception manager 1235 may be used to receive on a beam of a plurality of beams, from a base station, a DRS in a first instance of a periodic multi-beam DRS, as described for example with reference to FIG. 7 or 8. The DRS may include a synchronization signal sequence encoded based on a first code. A second instance of the periodic multi-beam DRS may include the DRS with the synchronization signal sequence encoded based on a second code.

The synchronization signal sequence decoder 1245 may be used to decode the synchronization signal sequence based on the first code, as described for example with reference to FIG. 7 or 8.

The random access manager 1250 may be used to perform a random access procedure with the base station based on the DRS, as described for example with reference to FIG. 7 or 8.

In some examples of the apparatus 1205, the DRS reception manager 1235 may be used to receive the DRS on the beam of the plurality of beams, from the base station, in each instance of a plurality of instances of a periodic multi-beam DRS, as described for example with reference to FIG. 4 or 5. The plurality of instances of the periodic multi-beam DRS may include the first instance of the periodic multi-beam DRS and the second instance of the periodic multi-beam DRS. In some examples, the first instance of the periodic multi-beam DRS and the second instance of the periodic multi-beam DRS may be consecutive instances based on the plurality of beams. Consecutive instances based on the plurality of beams may or may not be interspersed with one or more instances (of the periodic multi-beam DRS) based on one or more other pluralities of beams. In these examples, the synchronization signal sequence decoder 1245 may also be used to decode the synchronization signal sequence based on the second code.

In some examples of the apparatus 1205, the DRS reception manager 1235 may be used to receive the DRS on the beam of the plurality of beams, from the base station, in each instance of a plurality of instances of a periodic multi-beam DRS, as described for example with reference to FIG. 7 or 8. The plurality of instances of the periodic multi-beam DRS may include at least the first instance of the periodic multi-beam DRS, and each instance in the plurality of instances of the periodic multi-beam DRS may include the plurality of beams arranged in the first temporal order. The second instance of the periodic multi-beam DRS may not be included in the plurality of instances that includes the first instance. In some examples, the plurality of instances of the periodic multi-beam DRS may be consecutive instances based on the plurality of beams.

In some examples of the apparatus 1205, the DRS combiner 1240 may be used to combine the DRS across multiple instances of the plurality of instances of the periodic multi-beam DRS, as described for example with reference to FIG. 8.

In some examples of the apparatus 1205, the code identifier 1225 may be used to blindly detect the first code, as described for example with reference to FIG. 7 or 8. In these examples, the code information bit identifier 1230 may be used to identify a set of one or more information bits based on the first code. In some examples, the set of one or more information bits may include at least a part of a cell identifier, at least a portion of timing information for a cell, at least a part of a system frame number, or a combination.

The transmitter 1220 may transmit data or control signals or information (i.e., transmissions) generated by other components of the apparatus 1205, some or all of which may be associated with various information channels (e.g., data channels, control channels, etc.). In some examples, the transmitter 1220 may be collocated with the receiver 1210 in a transceiver. For example, the transmitter 1220 and receiver 1210 may be an example of aspects of the transceiver(s) 1430 described with reference to FIG. 14. The transmitter 1220 may include a single antenna or a plurality of antennae.

Figure 13:
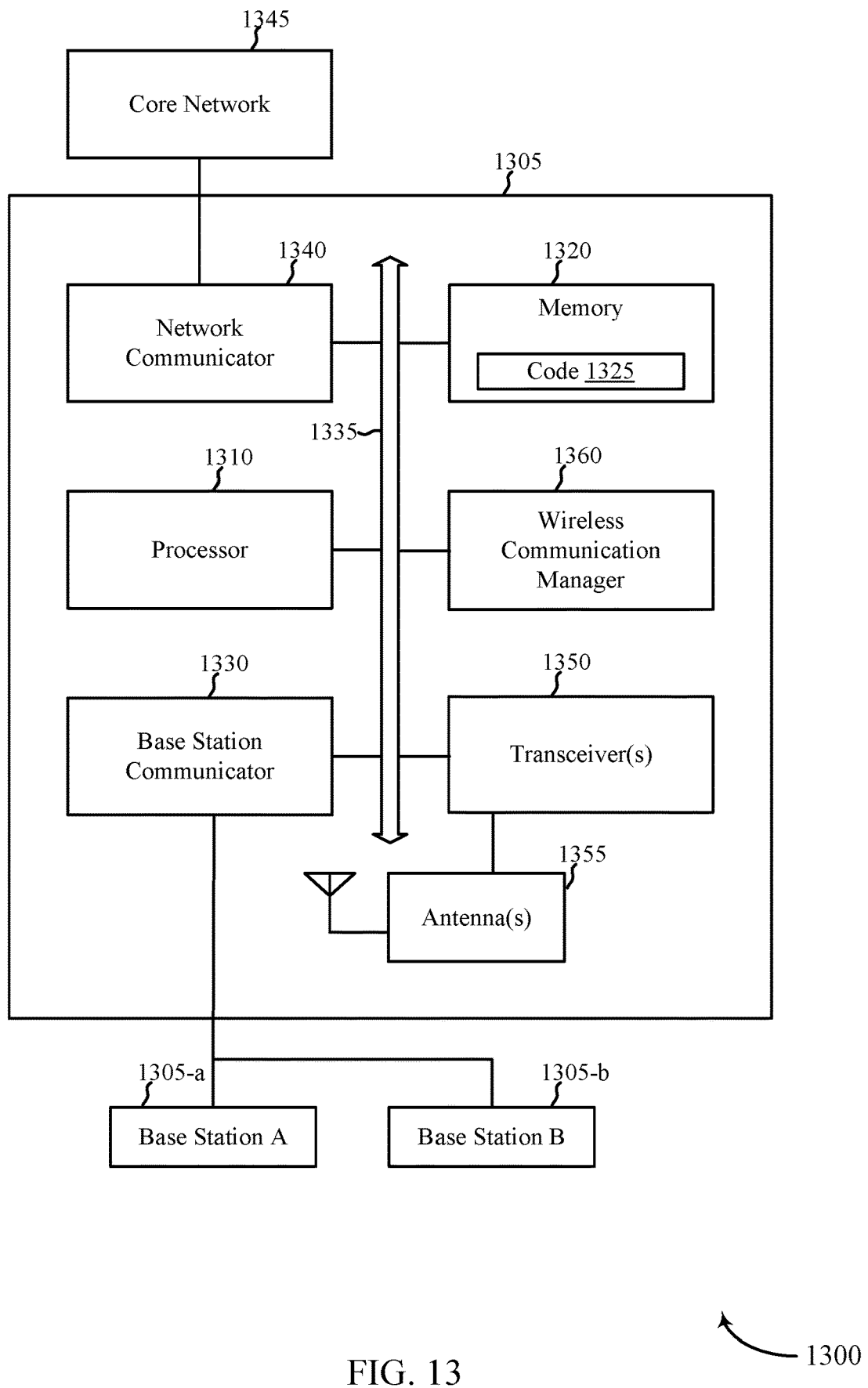
FIG. 13 shows a block diagram of a base station for use in wireless communication, in accordance with various aspects of the present disclosure.

FIG. 13 shows a block diagram 1300 of a base station 1305 for use in wireless communication, in accordance with various aspects of the present disclosure. In some examples, base station 1305 may be an example of one or more aspects of base stations 105, 205, or 305, described with reference to FIG. 1, 2, or 3; or aspects of the apparatus described with reference to FIG. 9 or 11. The base station 1305 may be configured to implement or facilitate at least some of the base station or apparatus techniques or functions described with reference to FIGS. 1-9 and 11.

The base station 1305 may include a processor 1310, memory 1320, at least one transceiver (represented by transceiver(s) 1350), at least one antenna 1355 (e.g., an antenna array), or a wireless communication manager 1360. The base station 1305 may also include one or more of a base station communicator 1330 or a network communicator 1340. Each of these components may be in communication with each other, directly or indirectly, over one or more buses 1335.

Memory 1320 may include random access memory (RAM) or read-only memory (ROM). Memory 1320 may store computer-readable, computer-executable code 1325 containing instructions that are configured to, when executed, cause the processor 1310 to perform various functions described herein related to wireless communication, including, for example, transmitting a periodic multi-beam DRS. Alternatively, the computer-executable code 1325 may not be directly executable by the processor 1310 but be configured to cause the base station 1305 (e.g., when compiled and executed) to perform various of the functions described herein.

The processor 1310 may include an intelligent hardware device, e.g., a central processing unit (CPU), a microcontroller, an ASIC, etc. The processor 1310 may process information received through the transceiver(s) 1350, the base station communicator 1330, or the network communicator 1340. The processor 1310 may also process information to be sent to the transceiver(s) 1350 for transmission through one or more antennas 1355, or to the base station communicator 1330 for transmission to one or more other base stations (e.g., base station 1305-a and base station 1305-b), or to the network communicator 1340 for transmission to a core network 1345, which may be an example of one or more aspects of the core network 130 described with reference to FIG. 1. The processor 1310 may handle, alone or in connection with the wireless communication manager 1360, one or more aspects of communicating over (or managing communications over) one or more radio frequency spectrum bands.

The transceiver(s) 1350 may include a modem configured to modulate packets and provide the modulated packets to the one or more antennas for transmission, and to demodulate packets received from the one or more antennas 1355. The transceiver(s) 1350 may, in some examples, be implemented as one or more transmitters and one or more separate receivers. The transceiver(s) 1350 may support communications in one or more radio frequency spectrum bands. The transceiver(s) 1350 may be configured to communicate bi-directionally, via the one or more antennas 1355, with one or more UEs or apparatuses, such as one or more of the UEs or apparatus described with reference to FIG. 1, 2, 3, 10, or 12. The base station 1305 may communicate with the core network 1345 through the network communicator 1340. The base station 1305 may also communicate with other base stations, such as the base station 1305-a and the base station 1305-b, using the base station communicator 1330.

The wireless communication manager 1360 may be configured to perform or control some or all of the techniques or functions described with reference to FIGS. 1-9 and 11. The wireless communication manager 1360, or portions of the wireless communication manager 1360, may include a processor; or some or all of the functions of the wireless communication manager 1360 may be performed by the processor 1310 or in connection with the processor 1310. In some examples, the wireless communication manager 1360 may be an example of the wireless communication manager described with reference to FIG. 9 or 11.

Figure 14:
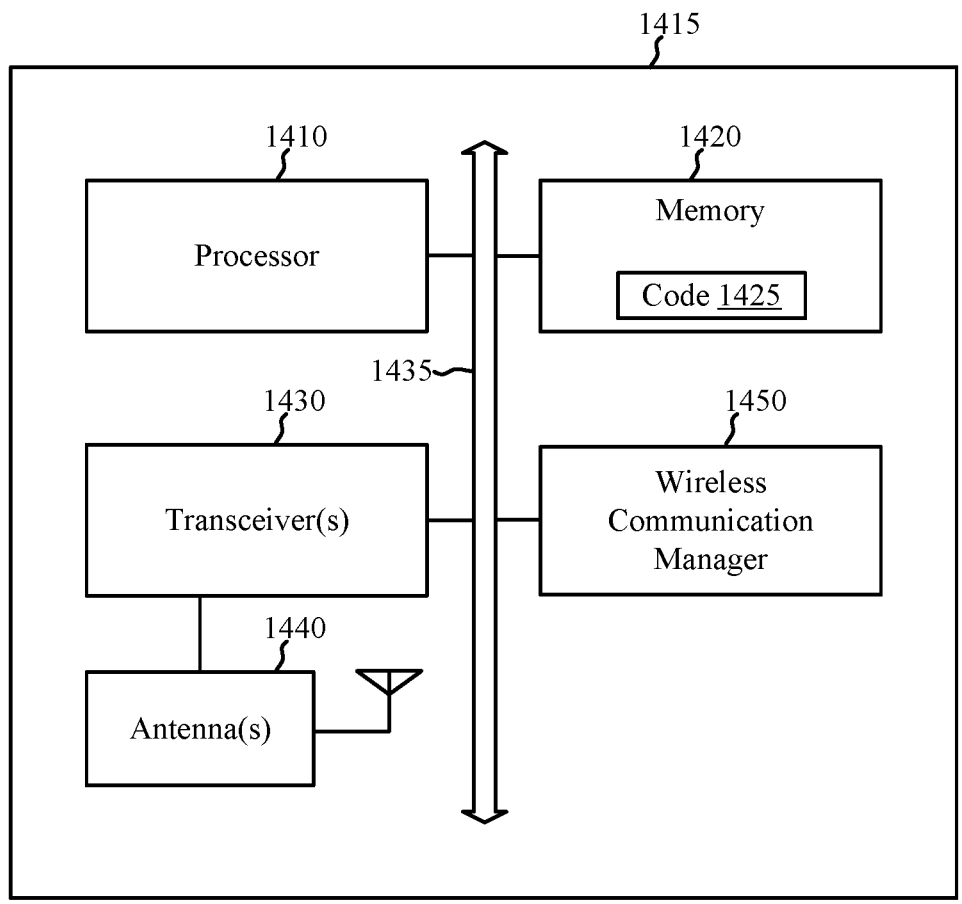
FIG. 14 shows a block diagram of a UE for use in wireless communication, in accordance with various aspects of the present disclosure.

FIG. 14 shows a block diagram 1400 of a UE 1415 for use in wireless communication, in accordance with various aspects of the present disclosure. The UE 1415 may be included or be part of a personal computer (e.g., a laptop computer, a netbook computer, a tablet computer, etc.), a cellular telephone, a PDA, a digital video recorder (DVR), an internet appliance, a gaming console, an e-reader, a vehicle, a home appliance, a lighting or alarm control system, etc. The UE 1415 may, in some examples, have an internal power supply (not shown), such as a small battery, to facilitate mobile operation. In some examples, the UE 1415 may be an example of aspects of one or more of the UEs described with reference to FIG. 1, 2, or 3, or aspects of the apparatus described with reference to FIG. 10 or 12. The UE 1415 may be configured to implement at least some of the UE or apparatus techniques or functions described with reference to FIGS. 1-8, 10, and 12.

The UE 1415 may include a processor 1410, memory 1420, at least one transceiver (represented by transceiver(s) 1430), one or more antennas 1440 (e.g., an antenna array), or a wireless communication manager 1450. Each of these components may be in communication with each other, directly or indirectly, over one or more buses 1435.

Memory 1420 may include RAM or ROM. Memory 1420 may store computer-readable, computer-executable code 1425 containing instructions that are configured to, when executed, cause the processor 1410 to perform various functions described herein related to wireless communication, including, for example, receiving a DRS included in one or more instances of a periodic multi-beam DRS. Alternatively, the computer-executable code 1425 may not be directly executable by the processor 1410 but may be configured to cause the UE 1415 (e.g., when compiled and executed) to perform various of the functions described herein.

The processor 1410 may include an intelligent hardware device (e.g., a CPU, a microcontroller, an ASIC, etc.). The processor 1410 may process information received through the transceiver(s) 1430 or information to be sent to the transceiver(s) 1430 for transmission through the one or more antennas 1440. The processor 1410 may handle, alone or in connection with the wireless communication manager 1450, one or more aspects of communicating over (or managing communications over) one or more radio frequency spectrum bands.

The transceiver(s) 1430 may include a modem configured to modulate packets and provide the modulated packets to the one or more antennas 1440 for transmission, and to demodulate packets received from the one or more antennas 1440. The transceiver(s) 1430 may, in some examples, be implemented as one or more transmitters and one or more separate receivers. The transceiver(s) 1430 may support communications in one or more radio frequency spectrum bands. The transceiver(s) 1430 may be configured to communicate bi-directionally, via the one or more antennas 1440, with one or more base stations or apparatuses, such as one or more of the base stations or apparatus described with reference to FIG. 1, 2, 3, 9, 11, or 13.

The wireless communication manager 1450 may be configured to perform or control some or all of the UE or apparatus techniques or functions described with reference to FIGS. 1-8, 10, and 12. The wireless communication manager 1450, or portions of it, may include a processor; or some or all of the functions of the wireless communication manager 1450 may be performed by the processor 1410 or in connection with the processor 1410. In some examples, the wireless communication manager 1450 may be an example of the wireless communication manager described with reference to FIG. 10 or 12.

Figure 15:
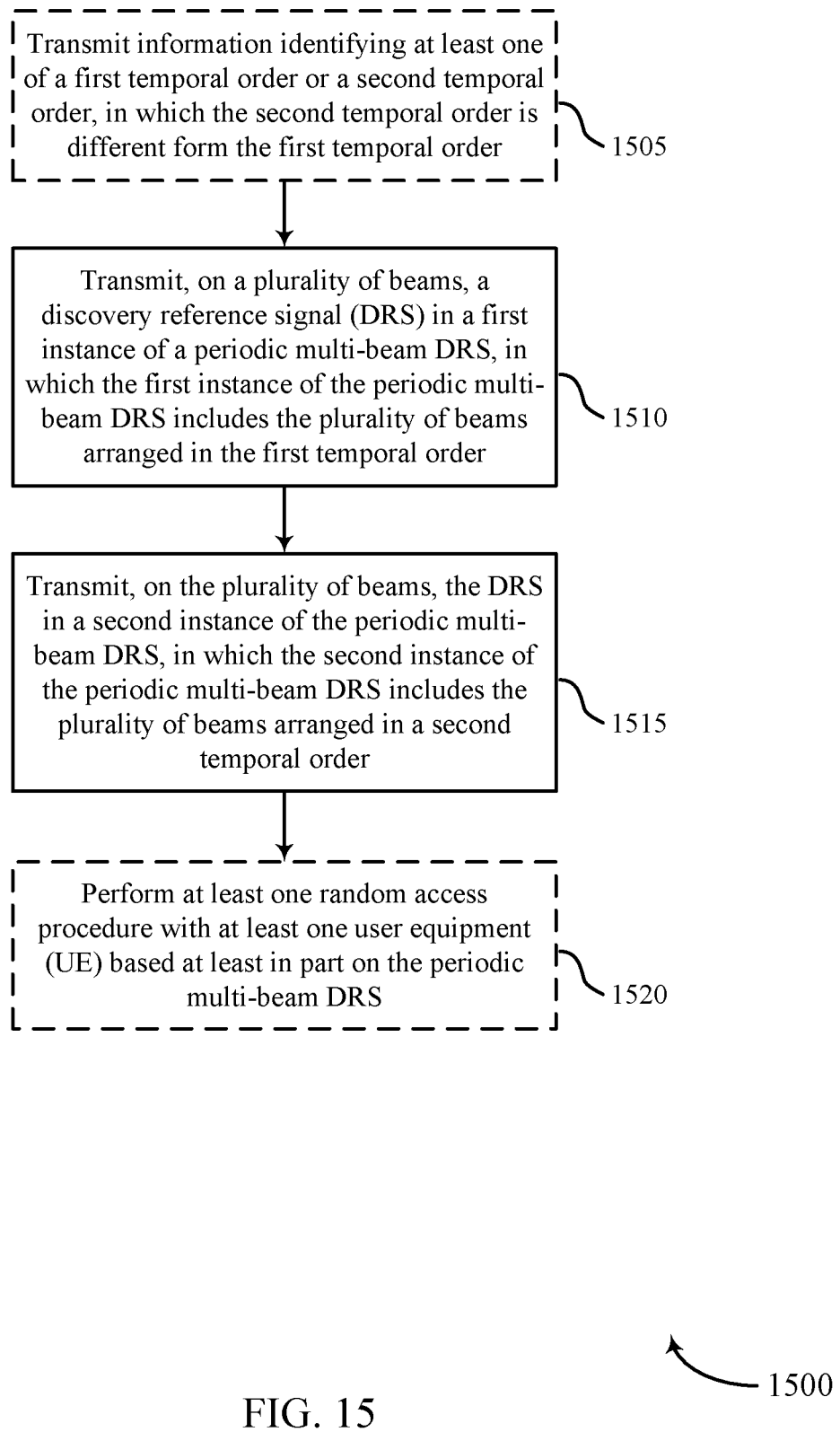
FIG. 15 is a flow chart illustrating examples of a method for wireless communication at a base station, in accordance with various aspects of the present disclosure.

FIG. 15 is a flow chart illustrating an example of a method 1500 for wireless communication at a base station, in accordance with various aspects of the present disclosure. For clarity, the method 1500 is described below with reference to aspects of one or more of the base stations described with reference to FIG. 1, 2, 3, or 13, aspects of the apparatus described with reference to FIG. 9, or aspects of one or more of the wireless communication managers described with reference to FIG. 9 or 13. In some examples, a base station may execute one or more sets of codes to control the functional elements of the base station to perform the functions described below. Additionally or alternatively, the base station may perform one or more of the functions described below using special-purpose hardware.

At block 1505, the method 1500 may optionally include transmitting information identifying at least one temporal order (e.g., a first temporal order or a second temporal order), as described for example with reference to FIG. 4 or 5. The second temporal order may be different from the first temporal order. In some examples, the operation(s) at block 1505 may be performed using the temporal order information transmission manager described with reference to FIG. 9.

At block 1510, the method 1500 may include transmitting, on a plurality of beams, a DRS in a first instance of a periodic multi-beam DRS, as described for example with reference to FIG. 4 or 5. The first instance of the periodic multi-beam DRS may include the plurality of beams arranged in the first temporal order. In some examples, the operation(s) at block 1510 may be performed using the periodic multi-beam DRS transmission manager described with reference to FIG. 9.

At block 1515, the method 1500 may include transmitting, on the plurality of beams, the DRS in a second instance of the periodic multi-beam DRS, as described for example with reference to FIG. 4 or 5. The second instance of the periodic multi-beam DRS may include the plurality of beams arranged in a second temporal order. In some examples, the operation(s) at block 1515 may be performed using the periodic multi-beam DRS transmission manager described with reference to FIG. 9.

At block 1520, the method 1500 may optionally include performing at least one random access procedure with at least one UE based on the periodic multi-beam DRS, as described for example with reference to FIG. 4 or 5. In some examples, the operation(s) at block 1520 may be performed using the random access manager described with reference to FIG. 9.

In some examples, the method 1500 may include transmitting the DRS on a beam in each instance of a plurality of instances of the periodic multi-beam DRS. The plurality of instances of the periodic multi-beam DRS may include the first instance of the periodic multi-beam DRS and the second instance of the periodic multi-beam DRS. In some examples, the first instance of the periodic multi-beam DRS and the second instance of the periodic multi-beam DRS may be consecutive instances based on the plurality of beams. Consecutive instances based on the plurality of beams may or may not be interspersed with one or more instances (of the periodic multi-beam DRS) based on one or more other pluralities of beams.

In some examples, the method 1500 may include transmitting the DRS on a beam in each instance of a plurality of instances of the periodic multi-beam DRS, and the plurality of instances of the periodic multi-beam DRS may include the first instance of the periodic multi-beam DRS, but not the second instance of the periodic multi-beam DRS. Each instance in the plurality of instances may include the plurality of beams arranged in the first temporal order. In some examples, the plurality of instances of the periodic multi-beam DRS may include consecutive instances based on the plurality of beams.

In some examples, the method 1500 may include selecting the first temporal order based on a set of one or more information bits to be conveyed by the DRS on a beam in the first instance of the periodic multi-beam DRS. Similarly, the method 1500 may include selecting the second temporal order based on a set of one or more information bits to be conveyed by the DRS on the beam in the second instance of the periodic multi-beam DRS. In some examples, the one or more information bits may include at least a part of a cell identifier, at least a portion of timing information for a cell, at least a part of a system frame number, or a combination.

Figure 16:
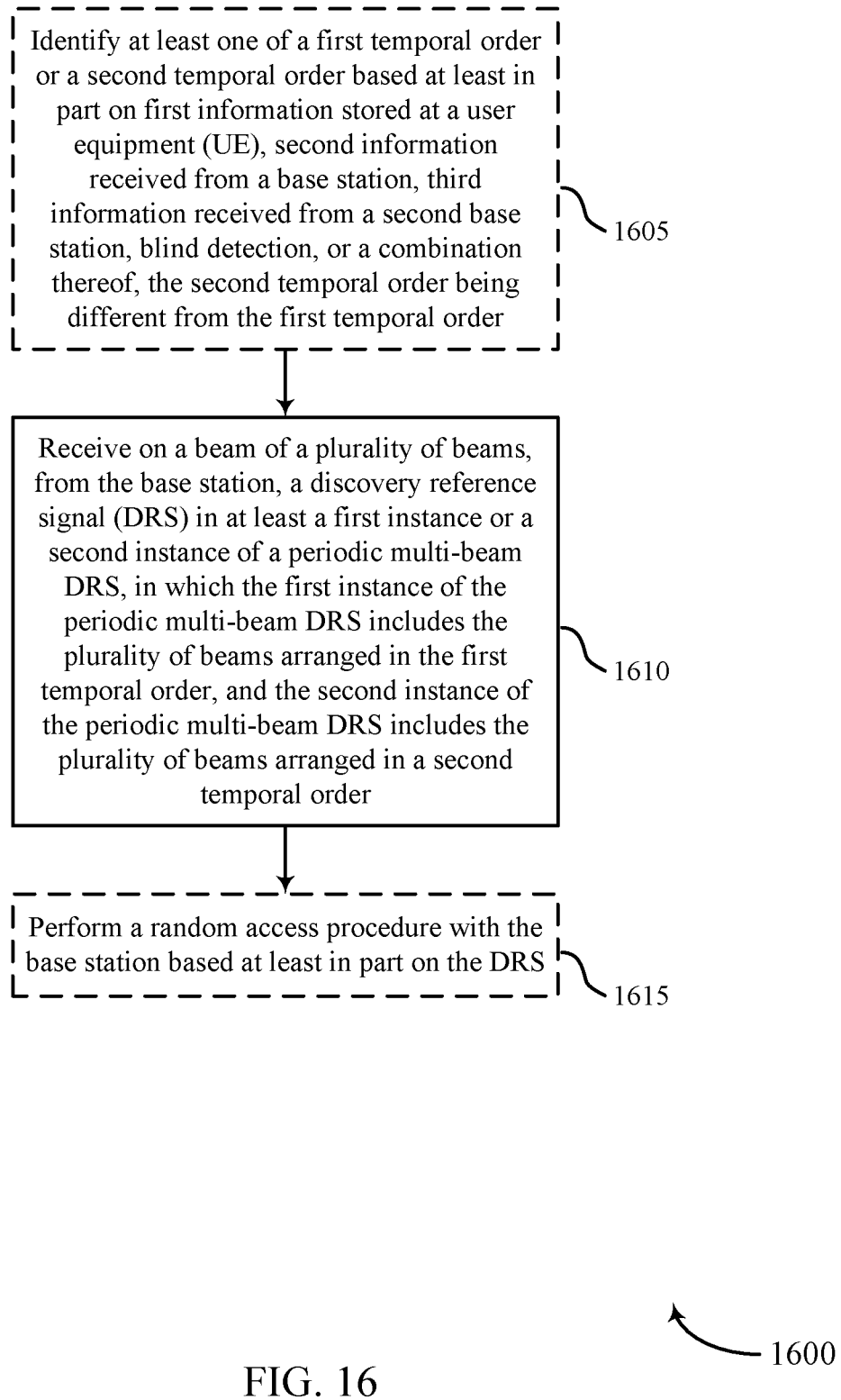
FIGS. 16-20 are flow charts illustrating examples of methods for wireless communication at a UE, in accordance with various aspects of the present disclosure.

FIG. 16 is a flow chart illustrating an example of a method 1600 for wireless communication at a UE, in accordance with various aspects of the present disclosure. For clarity, the method 1600 is described below with reference to aspects of one or more of the UEs described with reference to FIG. 1, 2, 3, or 14, aspects of the apparatus described with reference to FIG. 10, or aspects of one or more of the wireless communication managers described with reference to FIG. 10 or 14. In some examples, a UE may execute one or more sets of codes to control the functional elements of the UE to perform the functions described below. Additionally or alternatively, the UE may perform one or more of the functions described below using special-purpose hardware.

At block 1605, the method 1600 may optionally include identifying at least one of a first temporal order or a second temporal order used to permute a plurality of beams included in a periodic multi-beam DRS, as described for example with reference to FIG. 4 or 5. The first temporal order or second temporal order may be identified based on first information stored at the UE, second information received from a base station, third information received from a second base station, blind detection, or a combination. The second temporal order may be different from the first temporal order. In some examples, the operation(s) at block 1605 may be performed using the temporal order identifier described with reference to FIG. 10.

At block 1610, the method 1600 may include receiving on a beam of the plurality of beams, from the base station, a DRS in at least a first instance or a second instance of a periodic multi-beam DRS, as described for example with reference to FIG. 4 or 5. The first instance of the periodic multi-beam DRS may include the plurality of beams arranged in the first temporal order. The second instance of the periodic multi-beam DRS may include the plurality of beams arranged in the second temporal order. In some examples, the operation(s) at block 1610 may be performed using the DRS reception manager described with reference to FIG. 10.

At block 1615, the method 1600 may optionally include performing a random access procedure with the base station based on the DRS, as described for example with reference to FIG. 4 or 5. In some examples, the operation(s) at block 1615 may be performed using the random access manager described with reference to FIG. 10.

Figure 17:
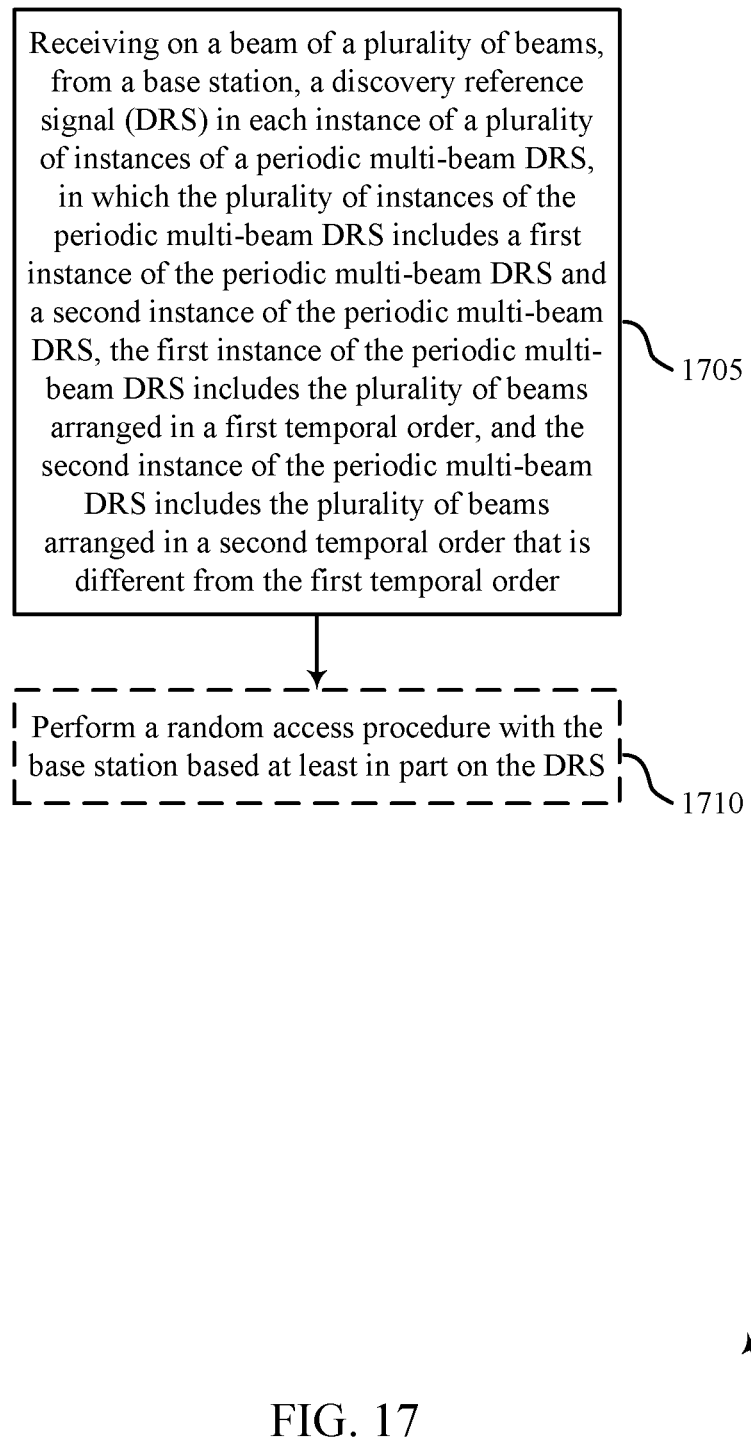

FIG. 17 is a flow chart illustrating an example of a method 1700 for wireless communication at a UE, in accordance with various aspects of the present disclosure. For clarity, the method 1700 is described below with reference to aspects of one or more of the UEs described with reference to FIG. 1, 2, 3, or 14, aspects of the apparatus described with reference to FIG. 10, or aspects of one or more of the wireless communication managers described with reference to FIG. 10 or 14. In some examples, a UE may execute one or more sets of codes to control the functional elements of the UE to perform the functions described below. Additionally or alternatively, the UE may perform one or more of the functions described below using special-purpose hardware.

At block 1705, the method 1700 may include receiving on a beam of a plurality of beams, from a base station, a DRS in each instance of a plurality of instances of a periodic multi-beam DRS, as described for example with reference to FIG. 4 or 5. The plurality of instances of the periodic multi-beam DRS may include a first instance of the periodic multi-beam DRS and a second instance of the periodic multi-beam DRS. The first instance of the periodic multi-beam DRS may include the plurality of beams arranged in a first temporal order. The second instance of the periodic multi-beam DRS may include the plurality of beams arranged in a second temporal order that is different from the first temporal order. In some examples, the first instance of the periodic multi-beam DRS and the second instance of the periodic multi-beam DRS may be consecutive instances based on the plurality of beams. Consecutive instances based on the plurality of beams may or may not be interspersed with one or more instances (of the periodic multi-beam DRS) based on one or more other pluralities of beams. In some examples, the operation(s) at block 1705 may be performed using the DRS reception manager described with reference to FIG. 10.

At block 1710, the method 1700 may optionally include performing a random access procedure with the base station based on the DRS, as described for example with reference to FIG. 4 or 5. In some examples, the operation(s) at block 1710 may be performed using the random access manager described with reference to FIG. 10.

Figure 18:
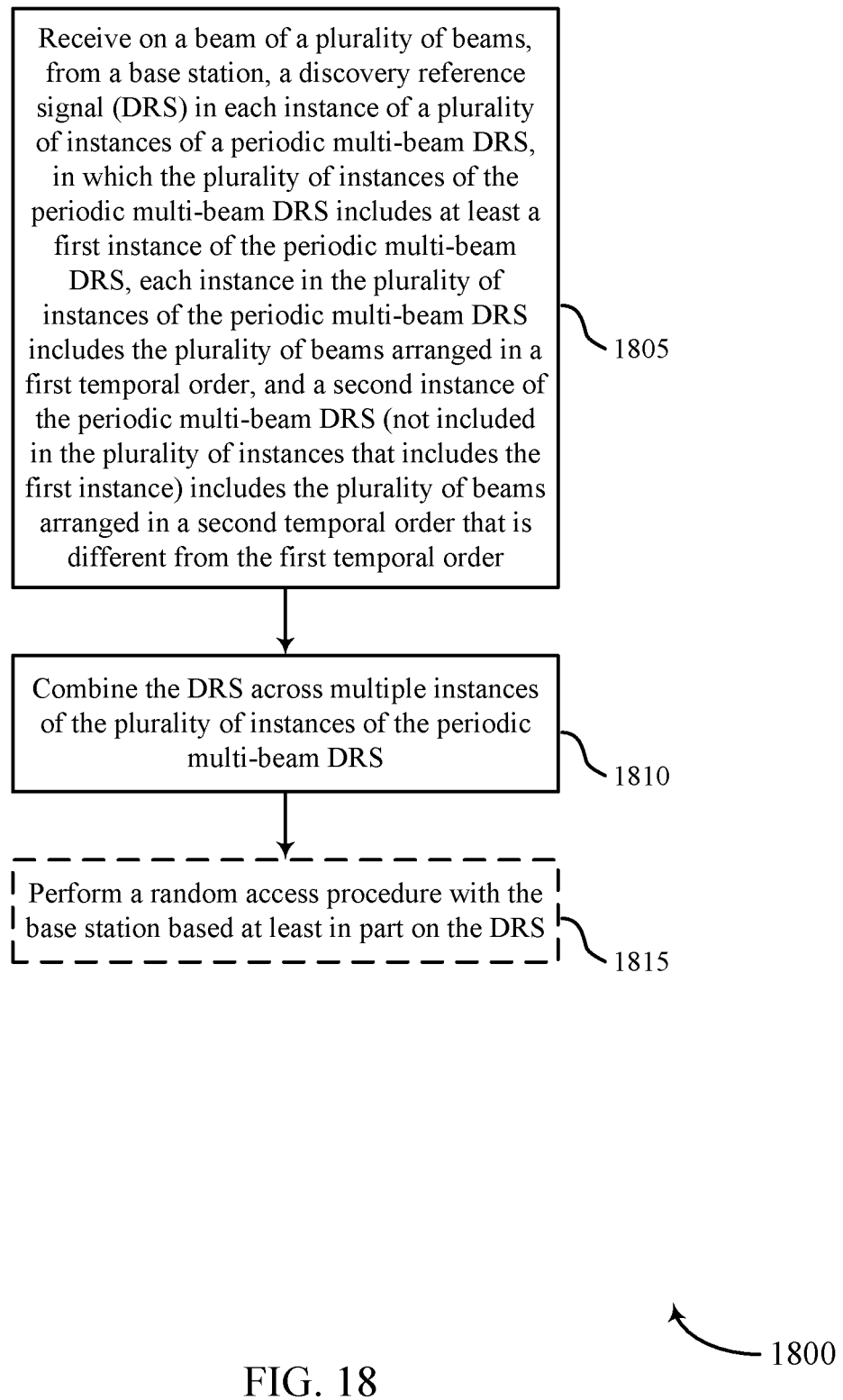

FIG. 18 is a flow chart illustrating an example of a method 1800 for wireless communication at a UE, in accordance with various aspects of the present disclosure. For clarity, the method 1800 is described below with reference to aspects of one or more of the UEs described with reference to FIG. 1, 2, 3, or 14, aspects of the apparatus described with reference to FIG. 10, or aspects of one or more of the wireless communication managers described with reference to FIG. 10 or 14. In some examples, a UE may execute one or more sets of codes to control the functional elements of the UE to perform the functions described below. Additionally or alternatively, the UE may perform one or more of the functions described below using special-purpose hardware.

At block 1805, the method 1800 may include receiving on a beam of a plurality of beams, from a base station, a DRS in each instance of a plurality of instances of a periodic multi-beam DRS, as described for example with reference to FIG. 4 or 5. The plurality of instances of the periodic multi-beam DRS may include at least a first instance of the periodic multi-beam DRS, and each instance in the plurality of instances of the periodic multi-beam DRS may include the plurality of beams arranged in a first temporal order. A second instance of the periodic multi-beam DRS (not included in the plurality of instances that includes the first instance) may include the plurality of beams arranged in a second temporal order that is different from the first temporal order. In some examples, the plurality of instances of the periodic multi-beam DRS may be consecutive instances based on the plurality of beams. Consecutive instances based on the plurality of beams may or may not be interspersed with one or more instances (of the periodic multi-beam DRS) based on one or more other pluralities of beams. In some examples, the operation(s) at block 1805 may be performed using the DRS reception manager described with reference to FIG. 10.

At block 1810, the method 1800 may optionally include combining the DRS across multiple instances of the plurality of instances of the periodic multi-beam DRS, as described for example with reference to FIG. 4 or 5. In some examples, the operation(s) at block 1810 may be performed using the DRS combiner described with reference to FIG. 10.

At block 1815, the method 1800 may optionally include performing a random access procedure with the base station based on the DRS, as described for example with reference to FIG. 4 or 5. In some examples, the operation(s) at block 1815 may be performed using the random access manager described with reference to FIG. 10.

Figure 19:
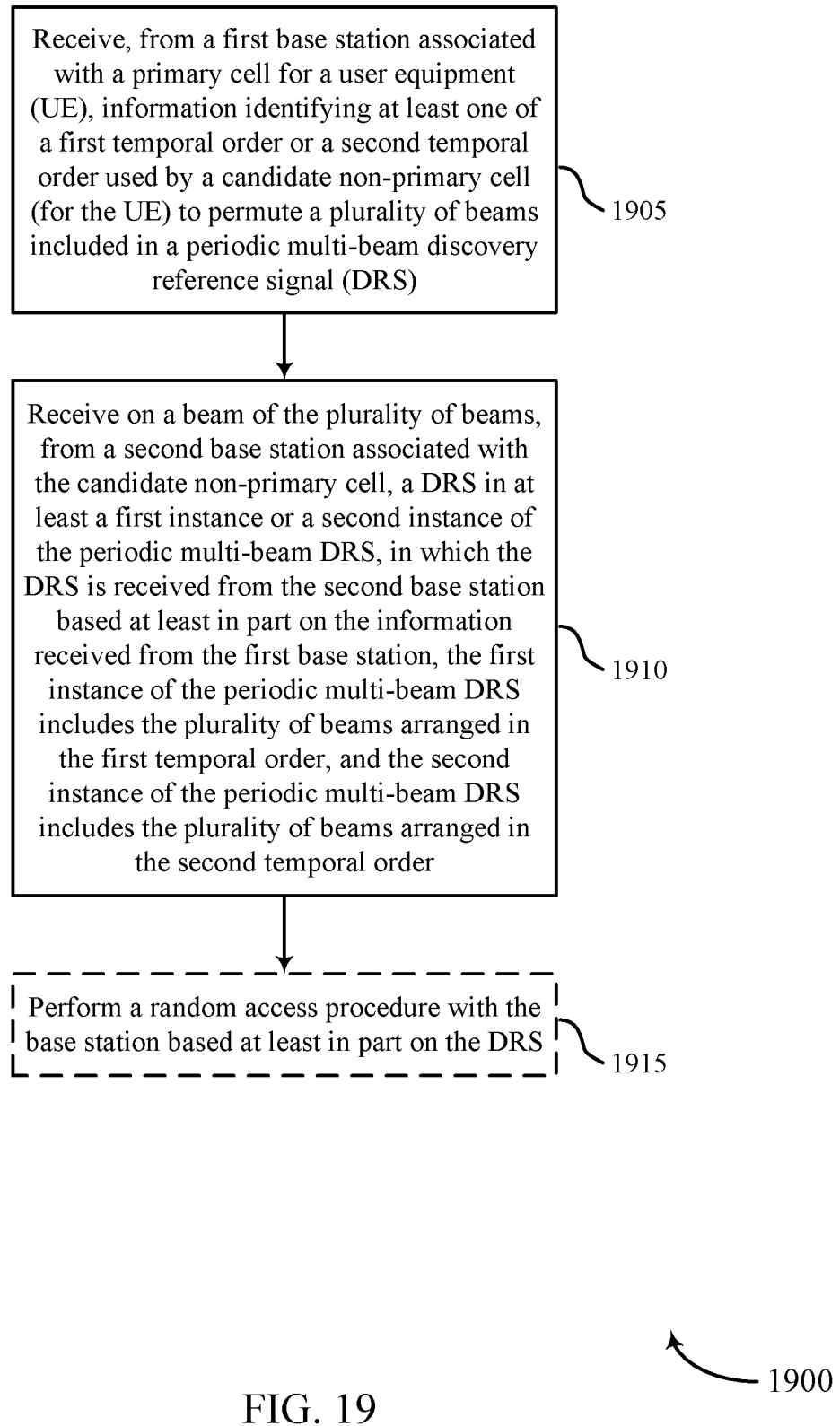

FIG. 19 is a flow chart illustrating an example of a method 1900 for wireless communication at a UE, in accordance with various aspects of the present disclosure. For clarity, the method 1900 is described below with reference to aspects of one or more of the UEs described with reference to FIG. 1, 2, 3, or 14, aspects of the apparatus described with reference to FIG. 10, or aspects of one or more of the wireless communication managers described with reference to FIG. 10 or 14. In some examples, a UE may execute one or more sets of codes to control the functional elements of the UE to perform the functions described below. Additionally or alternatively, the UE may perform one or more of the functions described below using special-purpose hardware.

At block 1905, the method 1900 may include receiving, from a first base station associated with a primary cell for the UE, information identifying at least one of a first temporal order or a second temporal order used by a candidate non-primary cell (i.e., for the UE), to permute a plurality of beams included in a periodic multi-beam DRS, as described for example with reference to FIG. 4 or 5. The second temporal order may be different from the first temporal order. In some examples, the operation(s) at block 1905 may be performed using the temporal order identifier described with reference to FIG. 10.

At block 1910, the method 1900 may include receiving on a beam of the plurality of beams, from a second base station associated with the candidate non-primary cell, a DRS in at least one of a first instance or a second instance of the periodic multi-beam DRS, as described for example with reference to FIG. 4 or 5. The DRS may be received from the second base station based on the information received from the first base station at block 1905. The first instance of the periodic multi-beam DRS may include the plurality of beams arranged in the first temporal order. The second instance of the periodic multi-beam DRS may include the plurality of beams arranged in the second temporal order. In some examples, the operation(s) at block 1910 may be performed using the DRS reception manager described with reference to FIG. 10.

At block 1915, the method 1900 may optionally include performing a random access procedure with the second base station based on the DRS, as described for example with reference to FIG. 4 or 5. In some examples, the operation(s) at block 1915 may be performed using the random access manager described with reference to FIG. 10.

Figure 20:
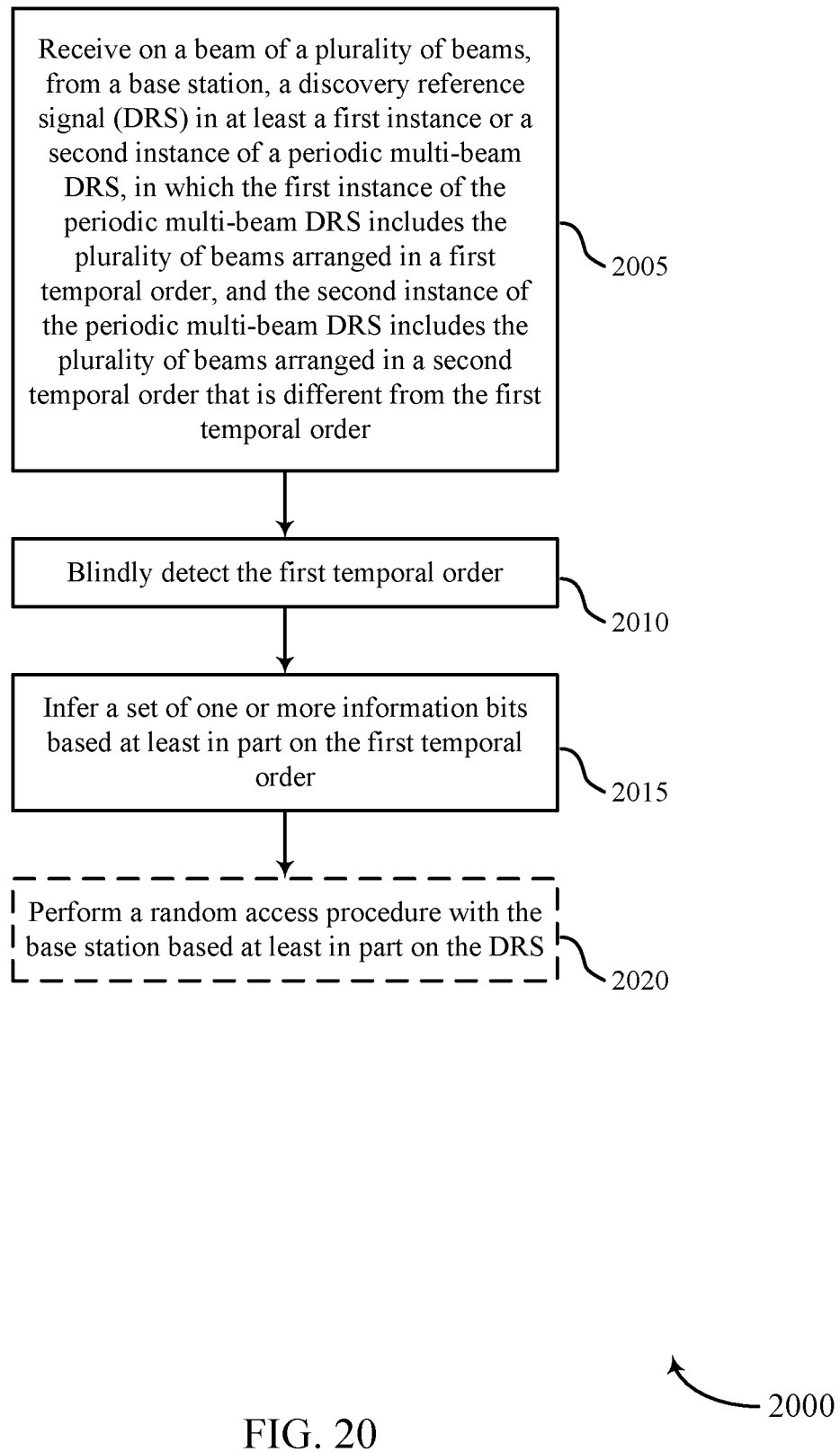

FIG. 20 is a flow chart illustrating an example of a method 2000 for wireless communication at a UE, in accordance with various aspects of the present disclosure. For clarity, the method 2000 is described below with reference to aspects of one or more of the UEs described with reference to FIG. 1, 2, 3, or 14, aspects of the apparatus described with reference to FIG. 10, or aspects of one or more of the wireless communication managers described with reference to FIG. 10 or 14. In some examples, a UE may execute one or more sets of codes to control the functional elements of the UE to perform the functions described below. Additionally or alternatively, the UE may perform one or more of the functions described below using special-purpose hardware.

At block 2005, the method 2000 may include receiving on a beam of a plurality of beams, from a base station, a DRS in at least a first instance or a second instance of a periodic multi-beam DRS, as described for example with reference to FIG. 4 or 5. The first instance of the periodic multi-beam DRS may include the plurality of beams arranged in a first temporal order. The second instance of the periodic multi-beam DRS may include the plurality of beams arranged in the second temporal order that is different from the first temporal order. In some examples, the operation(s) at block 1610 may be performed using the DRS reception manager described with reference to FIG. 10.

At block 2010, the method 2000 may include blindly detecting the first temporal order, as described for example with reference to FIG. 4 or 5. In some examples, the operation(s) at block 2010 may be performed using the temporal order identifier described with reference to FIG. 10.

At block 2015, the method 2000 may include inferring a set of one or more information bits based on the first temporal order, as described for example with reference to FIG. 4 or 5. In some examples, the set of one or more information bits may include at least a part of a cell identifier, at least a portion of timing information for a cell, at least a part of a system frame number, or a combination. In some examples, the operation(s) at block 2015 may be performed using the random access manager described with reference to FIG. 10.

At block 2020, the method 2000 may optionally include performing a random access procedure with the base station based on the DRS, as described for example with reference to FIG. 4 or 5. In some examples, the operation(s) at block 2020 may be performed using the random access manager described with reference to FIG. 10.

Figure 21:
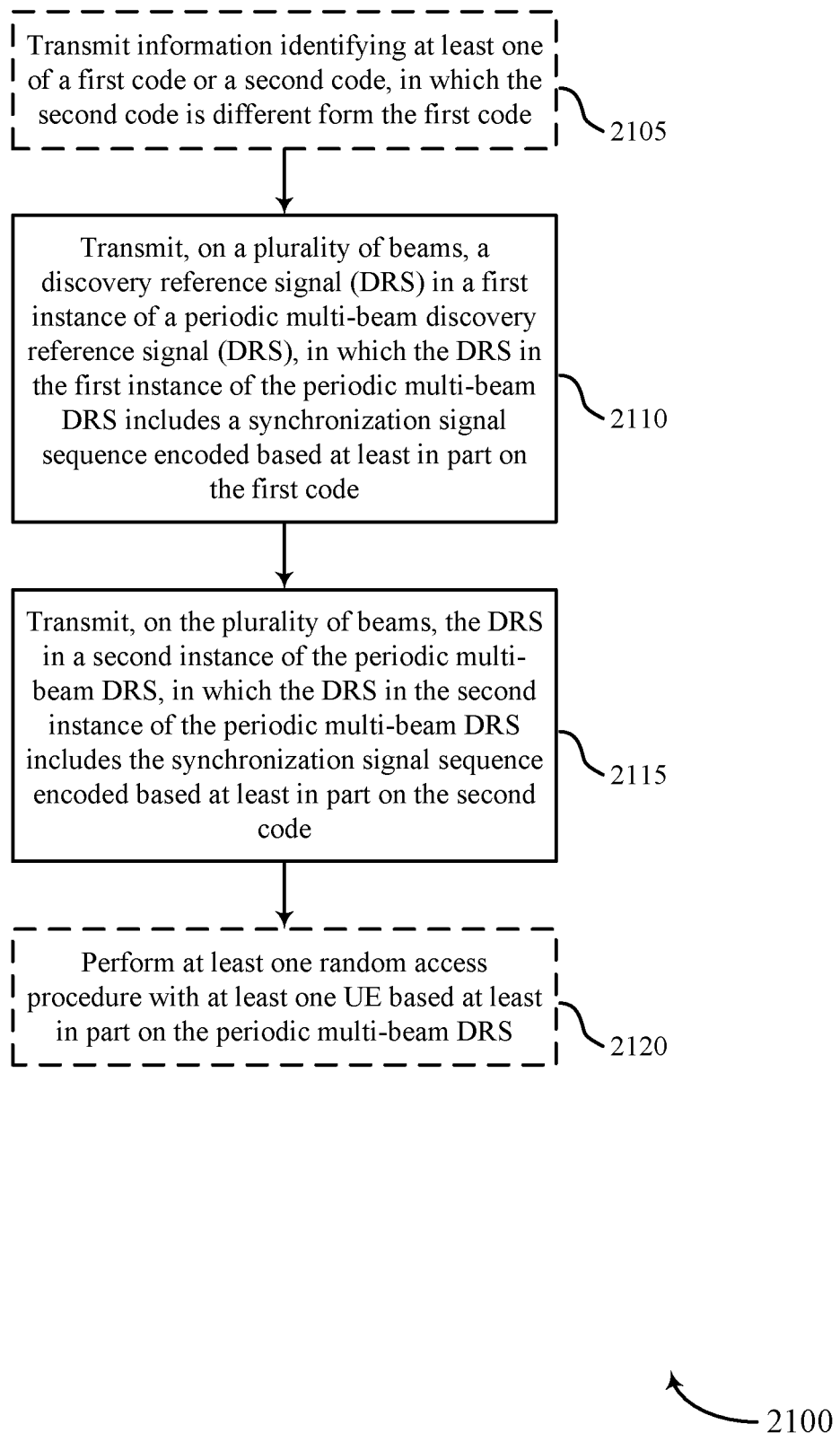
FIG. 21 is a flow chart illustrating an example of a method for wireless communication at a base station, in accordance with various aspects of the present disclosure.

FIG. 21 is a flow chart illustrating an example of a method 2100 for wireless communication at a base station, in accordance with various aspects of the present disclosure. For clarity, the method 2100 is described below with reference to aspects of one or more of the base stations described with reference to FIG. 1, 2, 3, or 13, aspects of the apparatus described with reference to FIG. 11, or aspects of one or more of the wireless communication managers described with reference to FIG. 11 or 13. In some examples, a base station may execute one or more sets of codes to control the functional elements of the base station to perform the functions described below. Additionally or alternatively, the base station may perform one or more of the functions described below using special-purpose hardware.

At block 2105, the method 2100 may optionally include transmitting information identifying at least one code (e.g., a first code or a second code), as described for example with reference to FIG. 7 or 8. The second code may be different from the first code. In some examples, the at least one code may include a scrambling code, an orthogonal cover code, or a combination. In some examples, the operation(s) at block 2105 may be performed using the code information transmission manager described with reference to FIG. 11.

At block 2110, the method 2100 may include transmitting, on a plurality of beams, a DRS in a first instance of a periodic multi-beam DRS, as described for example with reference to FIG. 7 or 8. The DRS in the first instance of the periodic multi-beam DRS may include a synchronization signal sequence encoded based on a first code. In some examples, the operation(s) at block 2110 may be performed using the periodic multi-beam DRS transmission manager described with reference to FIG. 11.

At block 2115, the method 2100 may include transmitting, on the plurality of beams, the DRS in a second instance of the periodic multi-beam DRS, as described for example with reference to FIG. 7 or 8. The DRS in the second instance of the periodic multi-beam DRS may include the synchronization signal sequence encoded based on a second code. In some examples, the operation(s) at block 2115 may be performed using the periodic multi-beam DRS transmission manager described with reference to FIG. 11.

At block 2120, the method 2100 may optionally include performing at least one random access procedure with at least one UE based on the periodic multi-beam DRS, as described for example with reference to FIG. 7 or 8. In some examples, the operation(s) at block 2120 may be performed using the periodic multi-beam DRS transmission manager described with reference to FIG. 11.

In some examples, the method 2100 may include transmitting the DRS on a beam in each instance of a plurality of instances of the periodic multi-beam DRS, and the plurality of instances of the periodic multi-beam DRS may include the first instance of the periodic multi-beam DRS and the second instance of the periodic multi-beam DRS. In some examples, the first instance of the periodic multi-beam DRS and the second instance of the periodic multi-beam DRS may be consecutive instances based on the plurality of beams. Consecutive instances based on the plurality of beams may or may not be interspersed with one or more instances (of the periodic multi-beam DRS) based on one or more other pluralities of beams.

In some examples, the method 2100 may include transmitting the DRS on a beam in each instance of a plurality of instances of the periodic multi-beam DRS, and the plurality of instances of the periodic multi-beam DRS may include the first instance of the periodic multi-beam DRS, but not the second instance of the periodic multi-beam DRS. Each instance in the plurality of instances may include the DRS with the synchronization signal sequence encoded based on the first code. In some examples, the plurality of instances of the periodic multi-beam DRS may include consecutive instances based on the plurality of beams.

In some examples, the method 2100 may include selecting the first code based on a set of one or more information bits to be conveyed by the DRS on a beam in the first instance of the periodic multi-beam DRS. Similarly, the method 2100 may include selecting the second code based on a set of one or more information bits to be conveyed by the DRS on the beam in the second instance of the periodic multi-beam DRS. In some examples, the one or more information bits may include at least a part of a cell identifier, at least a portion of timing information for a cell, at least a part of a system frame number, or a combination.

Figure 22:
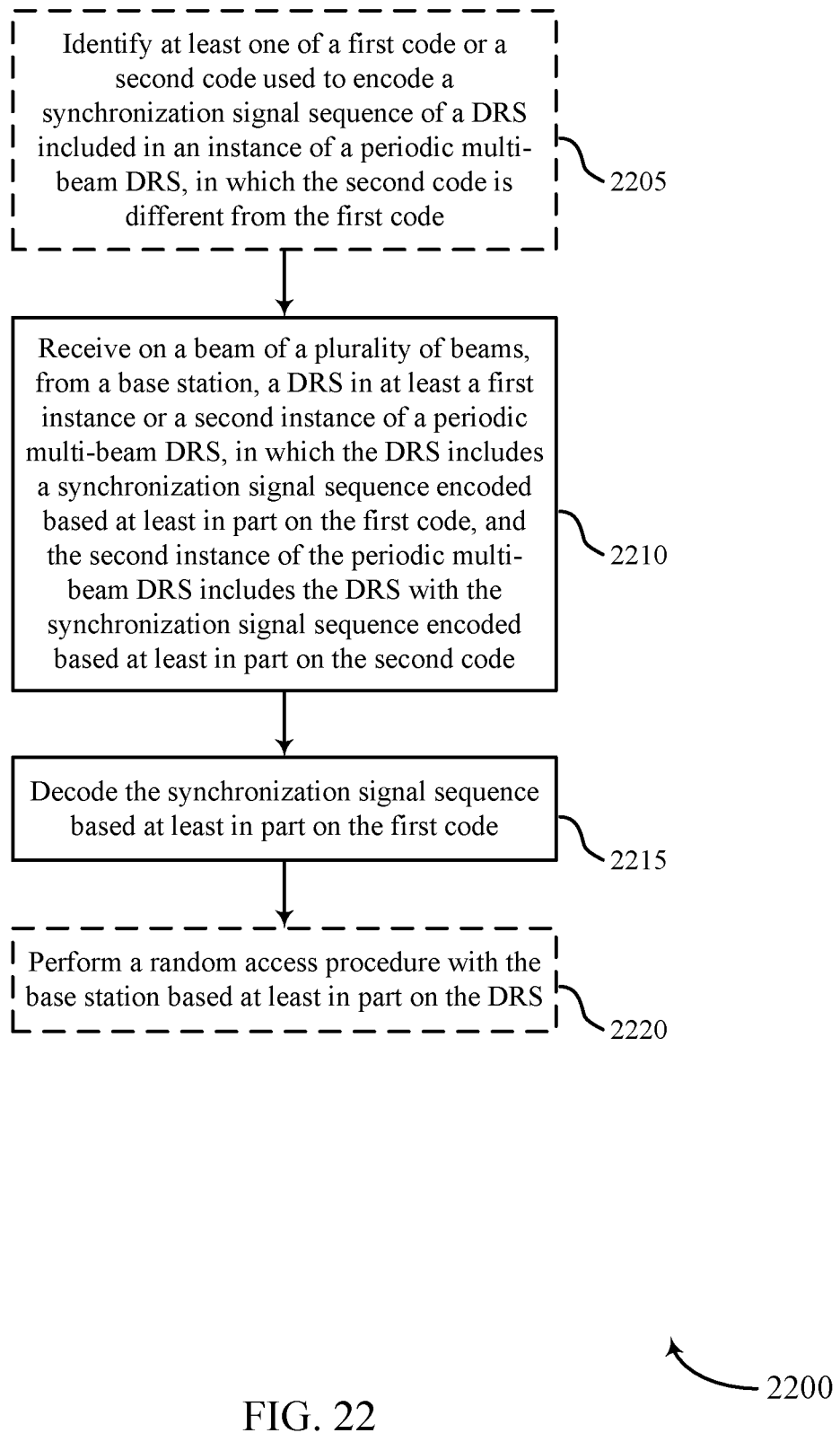
FIGS. 22-25 are flow charts illustrating examples of methods for wireless communication at a UE, in accordance with various aspects of the present disclosure.

FIG. 22 is a flow chart illustrating an example of a method 2200 for wireless communication at a UE, in accordance with various aspects of the present disclosure. For clarity, the method 2200 is described below with reference to aspects of one or more of the UEs described with reference to FIG. 1, 2, 3, or 14, aspects of the apparatus described with reference to FIG. 10, or aspects of one or more of the wireless communication managers described with reference to FIG. 10 or 14. In some examples, a UE may execute one or more sets of codes to control the functional elements of the UE to perform the functions described below. Additionally or alternatively, the UE may perform one or more of the functions described below using special-purpose hardware.

At block 2205, the method 2200 may optionally include identifying at least one of a first code or a second code used to encode a synchronization signal sequence of a DRS included in an instance of a periodic multi-beam DRS, as described for example with reference to FIG. 7 or 8. The first code or second code may be identified based on first information stored at the UE, second information received from a base station, third information received from a second base station, blind detection, or a combination. The first code or the second code may include a scrambling code, an orthogonal cover code, or a combination. The second code may be different from the first code. In some examples, the operation(s) at block 2205 may be performed using the code identifier described with reference to FIG. 12.

At block 2210, the method 2200 may include receiving on a beam of a plurality of beams, from a base station, a DRS in at least a first instance or a second instance of a periodic multi-beam DRS, as described for example with reference to FIG. 7 or 8. The DRS may include a synchronization signal sequence encoded based on a first code. The second instance of the periodic multi-beam DRS may include the DRS with the synchronization signal sequence encoded based on a second code. In some examples, the operation(s) at block 2210 may be performed using the DRS reception manager described with reference to FIG. 12.

At block 2215, the method 2200 may include decoding the synchronization signal sequence based on the first code, as described for example with reference to FIG. 7 or 8. In some examples, the operation(s) at block 2215 may be performed using the synchronization signal sequence decoder described with reference to FIG. 12.

At block 2220, the method 2200 may optionally include performing a random access procedure with the base station based on the DRS, as described for example with reference to FIG. 7 or 8. In some examples, the operation(s) at block 2220 may be performed using the random access manager described with reference to FIG. 12.

Figure 23:
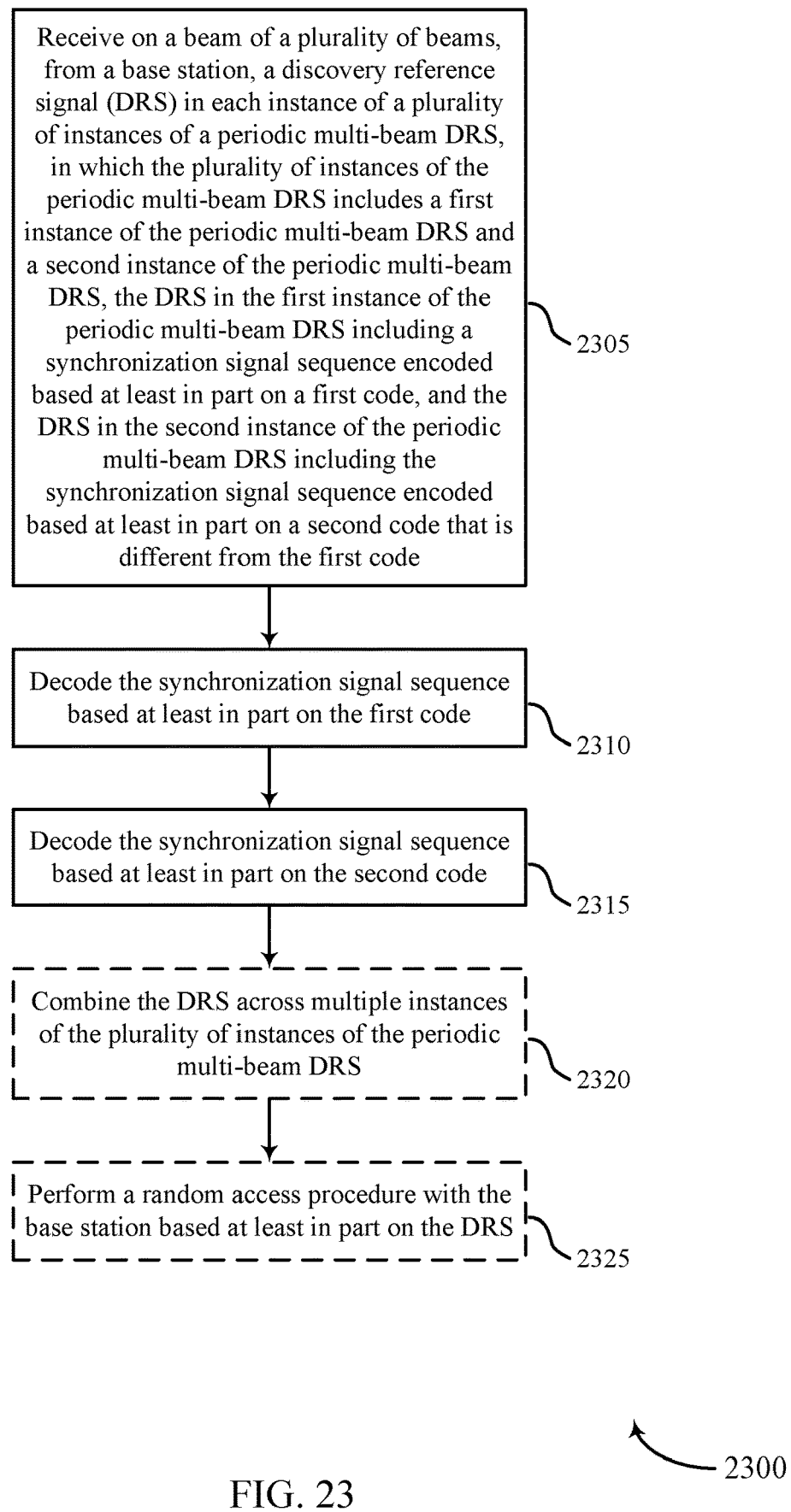

FIG. 23 is a flow chart illustrating an example of a method 2300 for wireless communication at a UE, in accordance with various aspects of the present disclosure. For clarity, the method 2300 is described below with reference to aspects of one or more of the UEs described with reference to FIG. 1, 2, 3, or 14, aspects of the apparatus described with reference to FIG. 10, or aspects of one or more of the wireless communication managers described with reference to FIG. 10 or 14. In some examples, a UE may execute one or more sets of codes to control the functional elements of the UE to perform the functions described below. Additionally or alternatively, the UE may perform one or more of the functions described below using special-purpose hardware.

At block 2305, the method 2300 may include receiving on a beam of a plurality of beams, from a base station, a DRS in each instance of a plurality of instances of a periodic multi-beam DRS, as described for example with reference to FIG. 7 or 8. The plurality of instances of the periodic multi-beam DRS may include a first instance of the periodic multi-beam DRS and a second instance of the periodic multi-beam DRS. In the first instance of the periodic multi-beam DRS, the DRS may include a synchronization signal sequence encoded based on a first code. In the second instance of the periodic multi-beam DRS, the DRS may include the synchronization signal sequence encoded based on a second code. The second code may be different from the first code. The first code or the second code may include a scrambling code, an orthogonal cover code, or a combination. In some examples, the first instance of the periodic multi-beam DRS and the second instance of the periodic multi-beam DRS may be consecutive instances based on the plurality of beams. Consecutive instances based on the plurality of beams may or may not be interspersed with one or more instances (of the periodic multi-beam DRS) based on one or more other pluralities of beams. In some examples, the operation(s) at block 2305 may be performed using the DRS reception manager described with reference to FIG. 12.

At block 2310, the method 2300 may include decoding the synchronization signal sequence based on the first code, as described for example with reference to FIG. 7 or 8. In some examples, the operation(s) at block 2310 may be performed using the synchronization signal sequence decoder described with reference to FIG. 12.

At block 2315, the method 2300 may include decoding the synchronization signal sequence based on the second code, as described for example with reference to FIG. 7 or 8. In some examples, the operation(s) at block 2315 may be performed using the synchronization signal sequence decoder described with reference to FIG. 12.

At block 2320, the method 2300 may optionally include combining the DRS across multiple instances of the plurality of instances of the periodic multi-beam DRS, as described for example with reference to FIG. 7 or 8. In some examples, the operation(s) at block 2320 may be performed using the random access manager described with reference to FIG. 12.

At block 2325, the method 2300 may optionally include performing a random access procedure with the base station based on the DRS, as described for example with reference to FIG. 7 or 8. In some examples, the operation(s) at block 2325 may be performed using the random access manager described with reference to FIG. 12.

Figure 24:
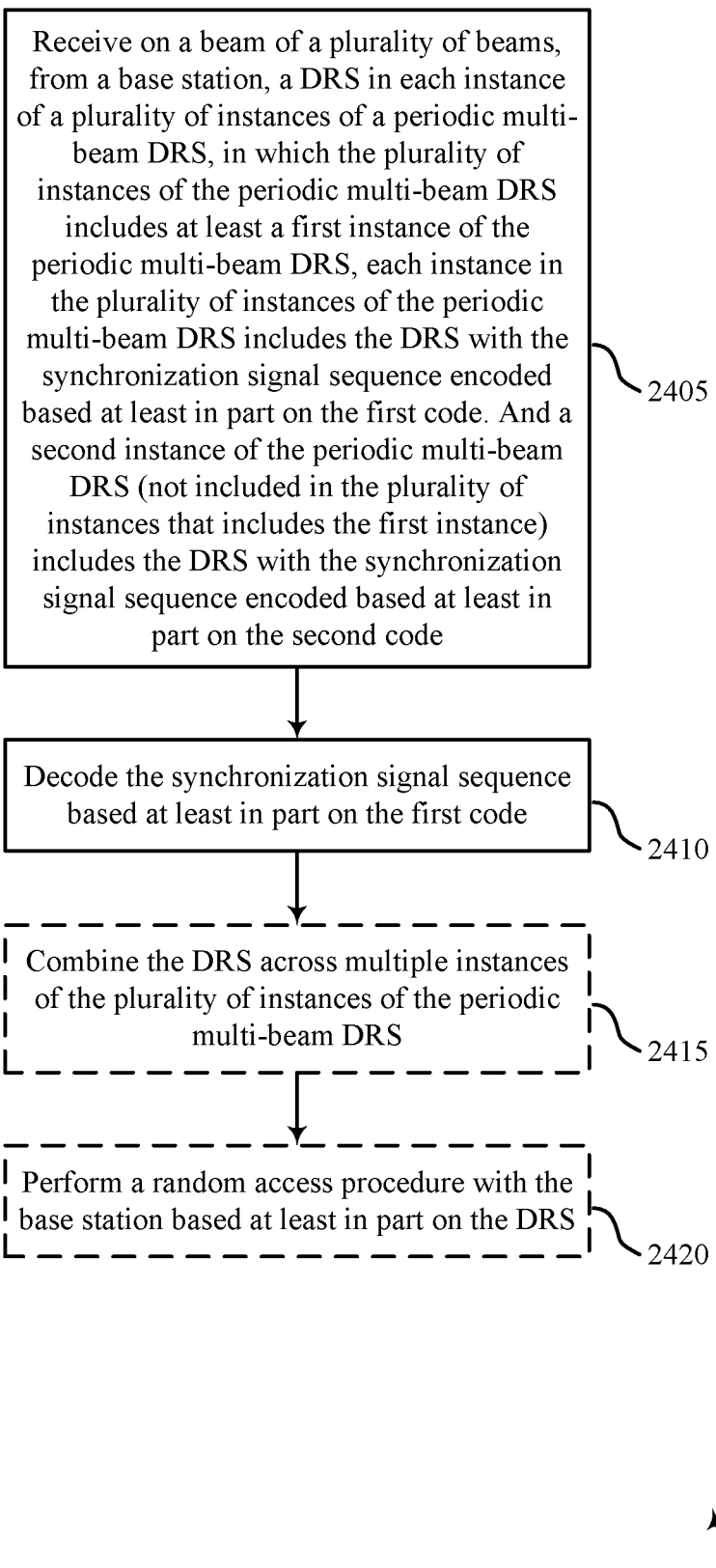

FIG. 24 is a flow chart illustrating an example of a method 2400 for wireless communication at a UE, in accordance with various aspects of the present disclosure. For clarity, the method 2400 is described below with reference to aspects of one or more of the UEs described with reference to FIG. 1, 2, 3, or 14, aspects of the apparatus described with reference to FIG. 10, or aspects of one or more of the wireless communication managers described with reference to FIG. 10 or 14. In some examples, a UE may execute one or more sets of codes to control the functional elements of the UE to perform the functions described below. Additionally or alternatively, the UE may perform one or more of the functions described below using special-purpose hardware.

At block 2405, the method 2400 may include receiving on a beam of a plurality of beams, from a base station, a DRS in each instance of a plurality of instances of a periodic multi-beam DRS, as described for example with reference to FIG. 7 or 8. The plurality of instances of the periodic multi-beam DRS may include at least a first instance of the periodic multi-beam DRS, and each instance in the plurality of instances of the periodic multi-beam DRS may include the DRS with the synchronization signal sequence encoded based on the first code. A second instance of the periodic multi-beam DRS (not included in the plurality of instances that includes the first instance) may include the DRS with the synchronization signal sequence encoded based on the second code. The second code may be different from the first code. The first code or the second code may include a scrambling code, an orthogonal cover code, or a combination. In some examples, the plurality of instances of the periodic multi-beam DRS may be consecutive instances based on the plurality of beams. Consecutive instances based on the plurality of beams may or may not be interspersed with one or more instances (of the periodic multi-beam DRS) based on one or more other pluralities of beams. In some examples, the operation(s) at block 2405 may be performed using the DRS reception manager described with reference to FIG. 12.

At block 2410, the method 2400 may include decoding the synchronization signal sequence based on the first code, as described for example with reference to FIG. 7 or 8. In some examples, the operation(s) at block 2410 may be performed using the synchronization signal sequence decoder described with reference to FIG. 12.

At block 2415, the method 2400 may optionally include combining the DRS across multiple instances of the plurality of instances of the periodic multi-beam DRS, as described for example with reference to FIG. 7 or 8. In some examples, the operation(s) at block 2415 may be performed using the random access manager described with reference to FIG. 12.

At block 2420, the method 2400 may optionally include performing a random access procedure with the base station based on the DRS, as described for example with reference to FIG. 7 or 8. In some examples, the operation(s) at block 2420 may be performed using the random access manager described with reference to FIG. 12.

Figure 25:
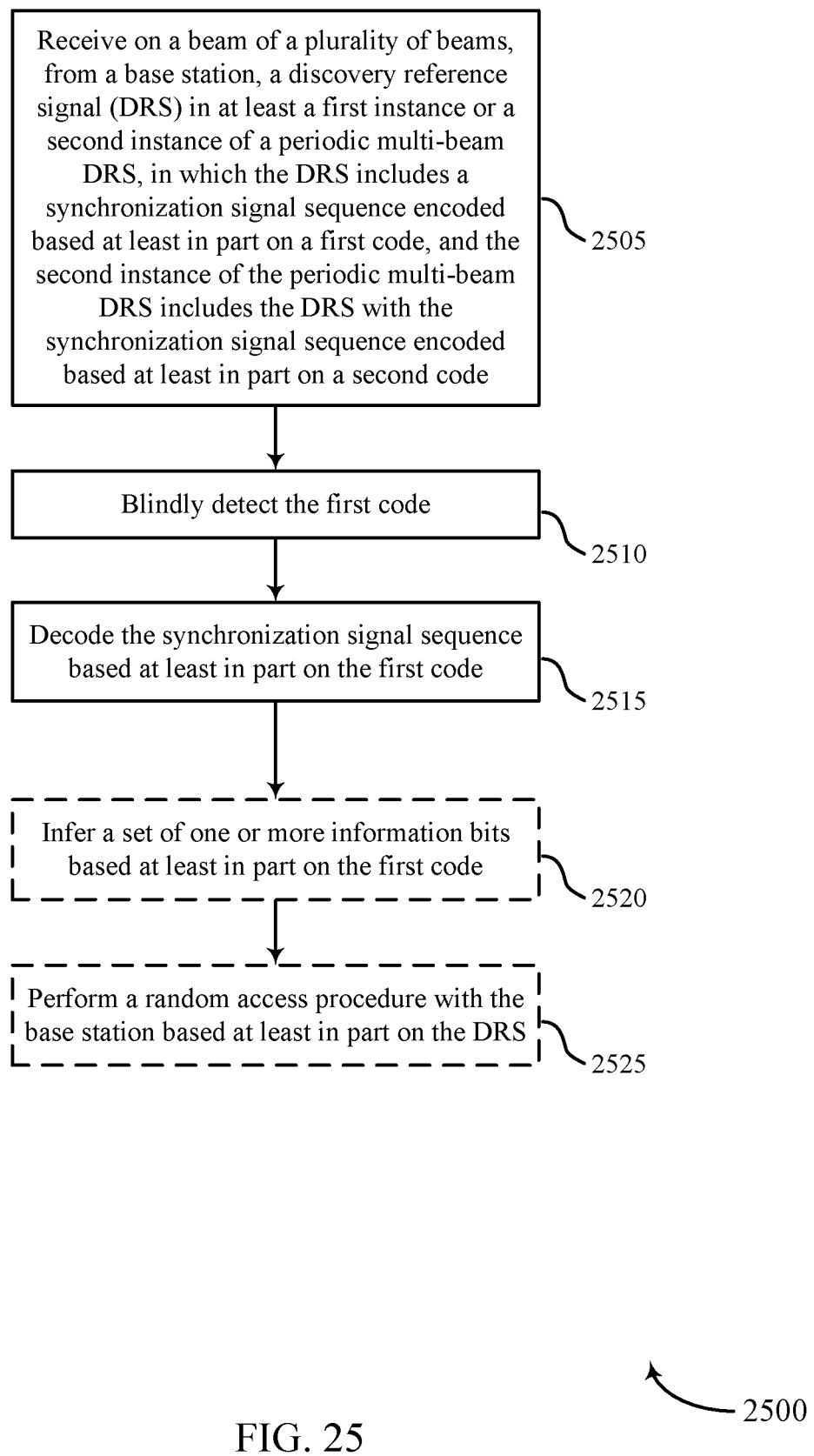

FIG. 25 is a flow chart illustrating an example of a method 2500 for wireless communication at a UE, in accordance with various aspects of the present disclosure. For clarity, the method 2500 is described below with reference to aspects of one or more of the UEs described with reference to FIG. 1, 2, 3, or 14, aspects of the apparatus described with reference to FIG. 10, or aspects of one or more of the wireless communication managers described with reference to FIG. 10 or 14. In some examples, a UE may execute one or more sets of codes to control the functional elements of the UE to perform the functions described below. Additionally or alternatively, the UE may perform one or more of the functions described below using special-purpose hardware.

At block 2505, the method 2500 may include receiving on a beam of a plurality of beams, from a base station, a DRS in at least a first instance or a second instance of a periodic multi-beam DRS, as described for example with reference to FIG. 7 or 8. The DRS may include a synchronization signal sequence encoded based on a first code. The second instance of the periodic multi-beam DRS may include the DRS with the synchronization signal sequence encoded based on a second code. The second code may be different than the first code. The first code or the second code may include a scrambling code, an orthogonal cover code, or a combination. In some examples, the operation(s) at block 2505 may be performed using the DRS reception manager described with reference to FIG. 12.

At block 2510, the method 2500 may include blindly detecting the first code, as described for example with reference to FIG. 7 or 8. In some examples, the operation(s) at block 2510 may be performed using the code identifier described with reference to FIG. 12.

At block 2515, the method 2500 may include decoding the synchronization signal sequence based on the first code, as described for example with reference to FIG. 7 or 8. In some examples, the operation(s) at block 2515 may be performed using the synchronization signal sequence decoder described with reference to FIG. 12.

At block 2520, the method 2500 may include inferring a set of one or more information bits based on the first code, as described for example with reference to FIG. 7 or 8. In some examples, the set of one or more information bits may include at least a part of a cell identifier, at least a portion of timing information for a cell, at least a part of a system frame number, or a combination. In some examples, the operation(s) at block 2520 may be performed using the code information bit identifier described with reference to FIG. 12.

At block 2525, the method 2500 may optionally include performing a random access procedure with the base station based on the DRS, as described for example with reference to FIG. 7 or 8. In some examples, the operation(s) at block 2525 may be performed using the random access manager described with reference to FIG. 12.

The methods 1500, 1600, 1700, 1800, 1900, 2000, 2100, 2200, 2300, 2400, and 2500 described with reference to FIGS. 15-25 may provide for wireless communication. It should be noted that the methods are example implementations of some of the techniques described in the present disclosure, and the operations of the methods may be rearranged, combined with other operations of the same or different method, or otherwise modified, such that other implementations are possible. In some examples, operations of the methods 1500 and 2100 may be combined. In other examples, operations of the methods 1600, 1700, 1800, 1900, 2000, 2200, 2300, 2400, and/or 2500 may be combined. In some examples, operations may be added to the methods.

Techniques described herein may be used for various wireless communication systems such as CDMA, TDMA, FDMA, OFDMA, SC-FDMA, and other systems. The terms "system" and "network" may be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, (e.g., a combination of a DSP and a microprocessor, multiple microprocessors, one or more microprocessors in conjunction with a DSP core, or any other such example).

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Additionally, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Additionally, any connection is properly termed a non-transitory computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a base station, comprising:
arranging a plurality of beams in a first temporal order based at least in part on a discovery reference signal (DRS) associated with a periodic multi-beam DRS;
transmitting, on the plurality of beams arranged in the first temporal order, the DRS in a first instance of the periodic multi-beam DRS;
arranging the plurality of beams in a second temporal order based at least in part on the DRS associated with the periodic multi-beam DRS; and
transmitting, on the plurality of beams arranged in the second temporal order, the DRS in a second instance of the periodic multi-beam DRS.

2. The method of claim 1, further comprising:
transmitting the DRS on a beam in each instance of a plurality of instances of the periodic multi-beam DRS, wherein the plurality of instances of the periodic multi-beam DRS comprises the first instance of the periodic multi-beam DRS and the second instance of the periodic multi-beam DRS.

3. The method of claim 2, wherein the first instance of the periodic multi-beam DRS and the second instance of the periodic multi-beam DRS are consecutive instances based at least in part on the plurality of beams.

4. The method of claim 1, further comprising:
transmitting the DRS on a beam in each instance of a plurality of instances of the periodic multi-beam DRS, wherein the plurality of instances of the periodic multi-beam DRS comprises the first instance of the periodic multi-beam DRS, and each instance in the plurality of instances comprises the plurality of beams arranged in the first temporal order.

5. The method of claim 4, wherein the plurality of instances of the periodic multi-beam DRS comprise consecutive instances based at least in part on the plurality of beams.

6. The method of claim 1, further comprising:
transmitting information identifying at least one of the first temporal order or the second temporal order; and
performing at least one random access procedure with at least one user equipment (UE) based at least in part on the periodic multi-beam DRS.

7. The method of claim 1, further comprising:
selecting the first temporal order based at least in part on a set of one or more information bits to be conveyed by the DRS on a beam in the first instance of the periodic multi-beam DRS, wherein the one or more information bits comprise at least one of: at least a part of a cell identifier, at least a portion of timing information for a cell, at least a part of a system frame number, or a combination thereof.

8. A method for wireless communication at a user equipment (UE), comprising:
receiving on a beam of a plurality of beams, from a base station, a discovery reference signal (DRS) in at least a first instance or a second instance of a periodic multi-beam DRS, wherein the first instance of the periodic multi-beam DRS comprises the plurality of beams arranged in a first temporal order, and the second instance of the periodic multi-beam DRS comprises the plurality of beams arranged in a second temporal order that is different from the first temporal order; and
identifying at least one of the first temporal order or the second temporal order based at least in part on: first information stored at the UE, or second information received from the base station, or third information received from a second base station, or a combination thereof.

9. The method of claim 8, further comprising:
receiving the DRS on the beam, from the base station, in each instance of a plurality of instances of the periodic multi-beam DRS, wherein the plurality of instances of the periodic multi-beam DRS comprises the first instance of the periodic multi-beam DRS and the second instance of the periodic multi-beam DRS.

10. The method of claim 9, wherein the first instance of the periodic multi-beam DRS and the second instance of the periodic multi-beam DRS are consecutive instances based at least in part on the plurality of beams.

11. The method of claim 8, further comprising:
receiving the DRS on the beam, from the base station, in each instance of a plurality of instances of the periodic multi-beam DRS, wherein the plurality of instances of the periodic multi-beam DRS comprises the first instance of the periodic multi-beam DRS, and each instance in the plurality of instances comprises the plurality of beams arranged in the first temporal order; and
combining the DRS across multiple instances of the plurality of instances of the periodic multi-beam DRS.

12. The method of claim 11, wherein the plurality of instances of the periodic multi-beam DRS comprise consecutive instances based at least in part on the plurality of beams.

13. The method of claim 8, further comprising:
performing a random access procedure with the base station based at least in part on the DRS.

14. The method of claim 8, wherein the base station is associated with a candidate non-primary cell for the UE, the method further comprising:
receiving, from a second base station associated with a primary cell for the UE, information identifying at least one of the first temporal order or the second temporal order for the candidate non-primary cell, wherein the DRS is received from the base station based at least in part on the information received from the second base station.

15. The method of claim 8, further comprising:
blindly detecting the first temporal order; and
inferring a set of one or more information bits based at least in part on the first temporal order, wherein the set of one or more information bits comprise at least one of: at least a part of a cell identifier, at least a portion of timing information for a cell, at least a part of a system frame number, or a combination thereof.

* * * * *